May 12, 1931.  E. M. BRACKETT ET AL  1,805,128
PAPER CUTTING AND TRIMMING MACHINE AND GAUGE AND GAUGE STOP,
CARRIER, HOLD-DOWN, AND SAFETY MECHANISM THEREFOR
Filed April 30 1928  11 Sheets-Sheet 1

Inventors
Edward M. Brackett
Dietrich Hancke
By Harry J. Cromer
Atty.

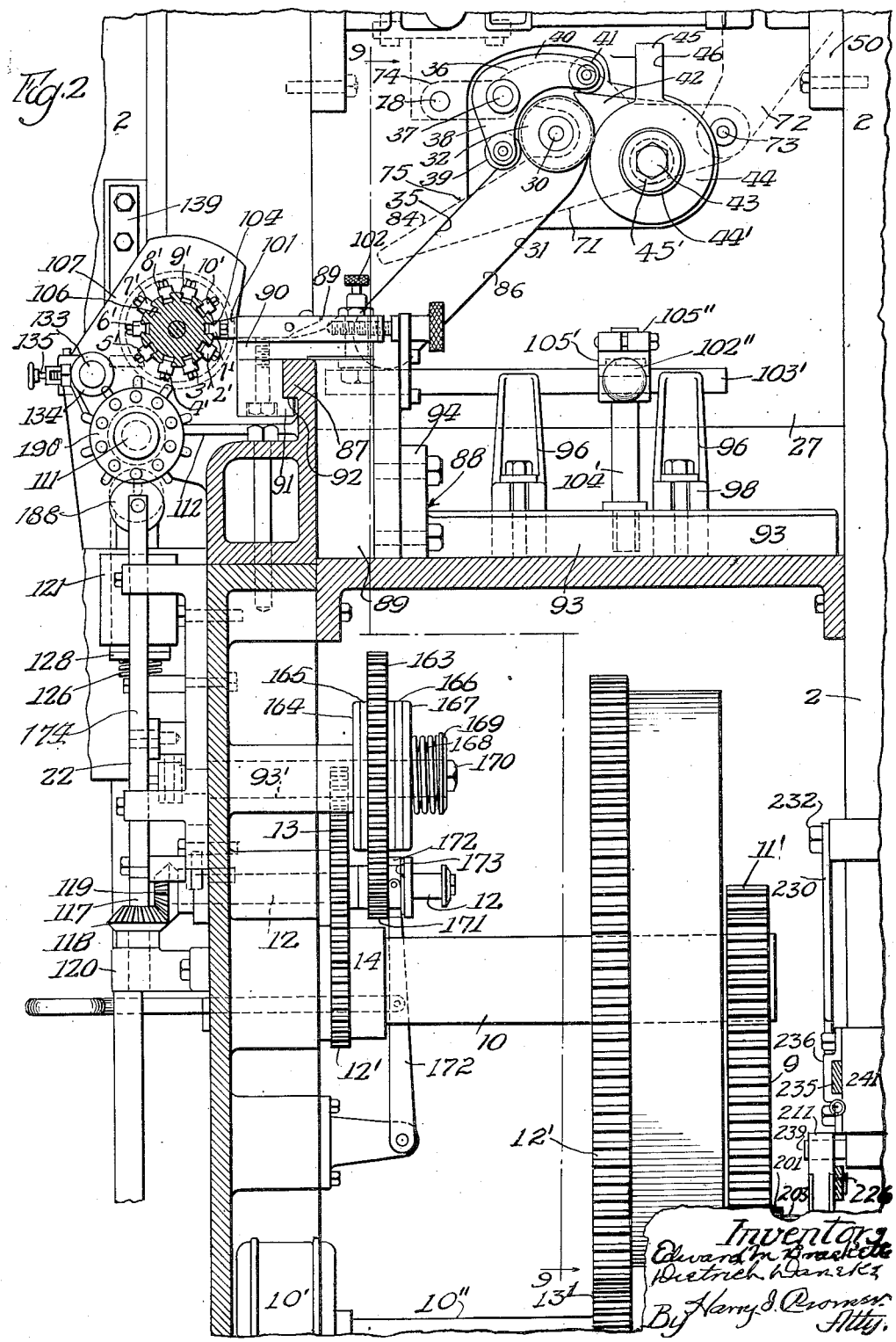

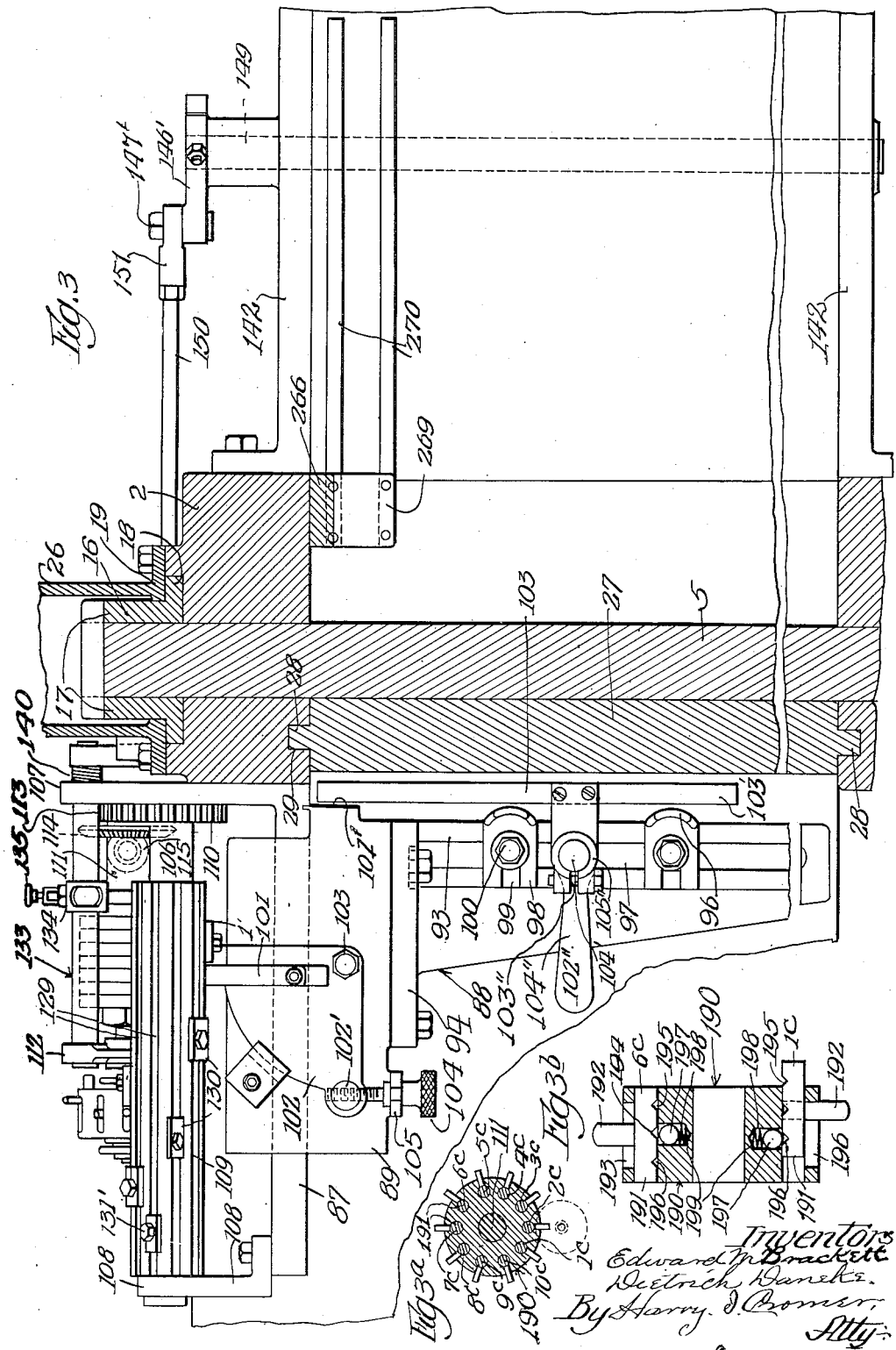

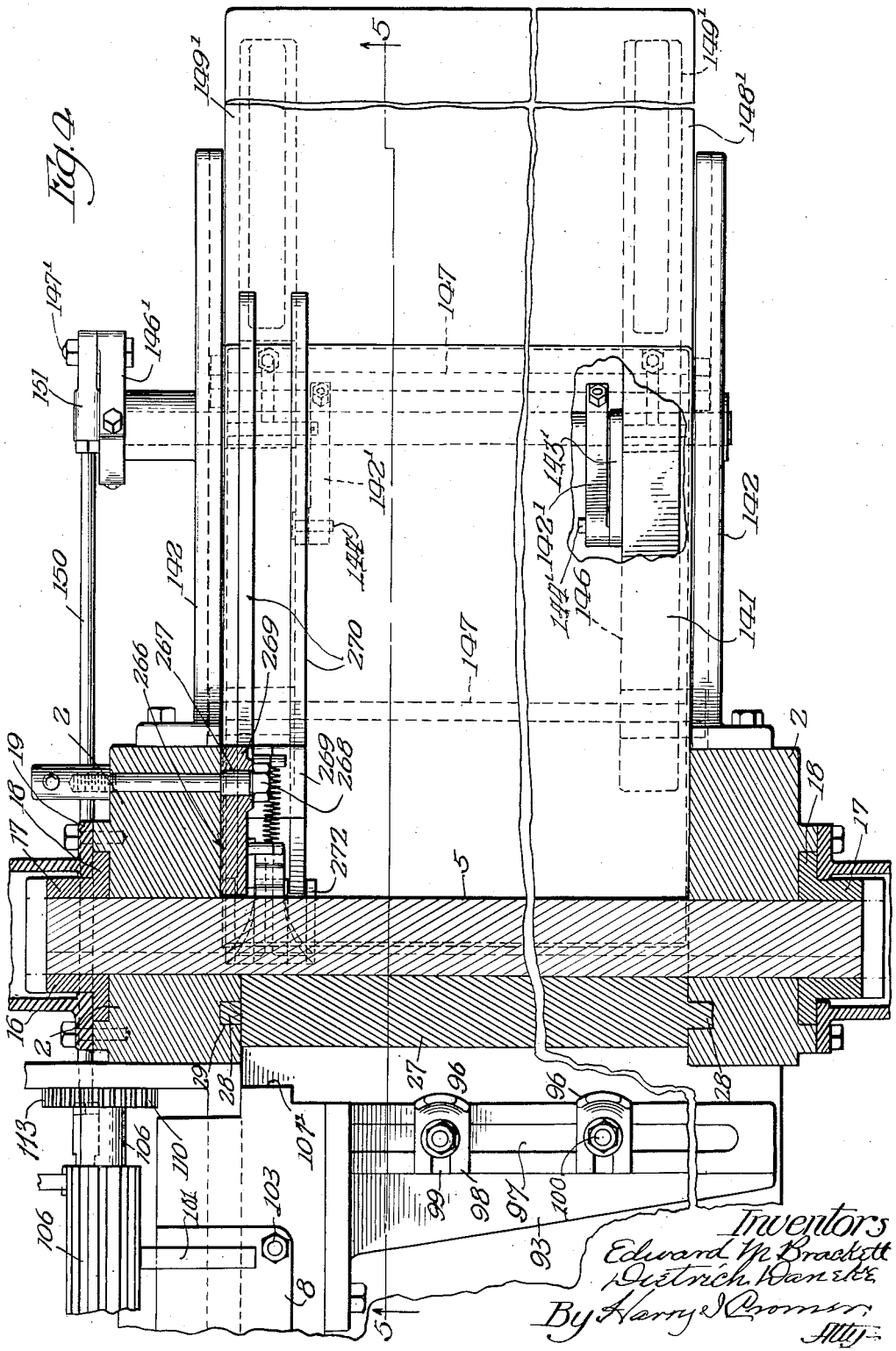

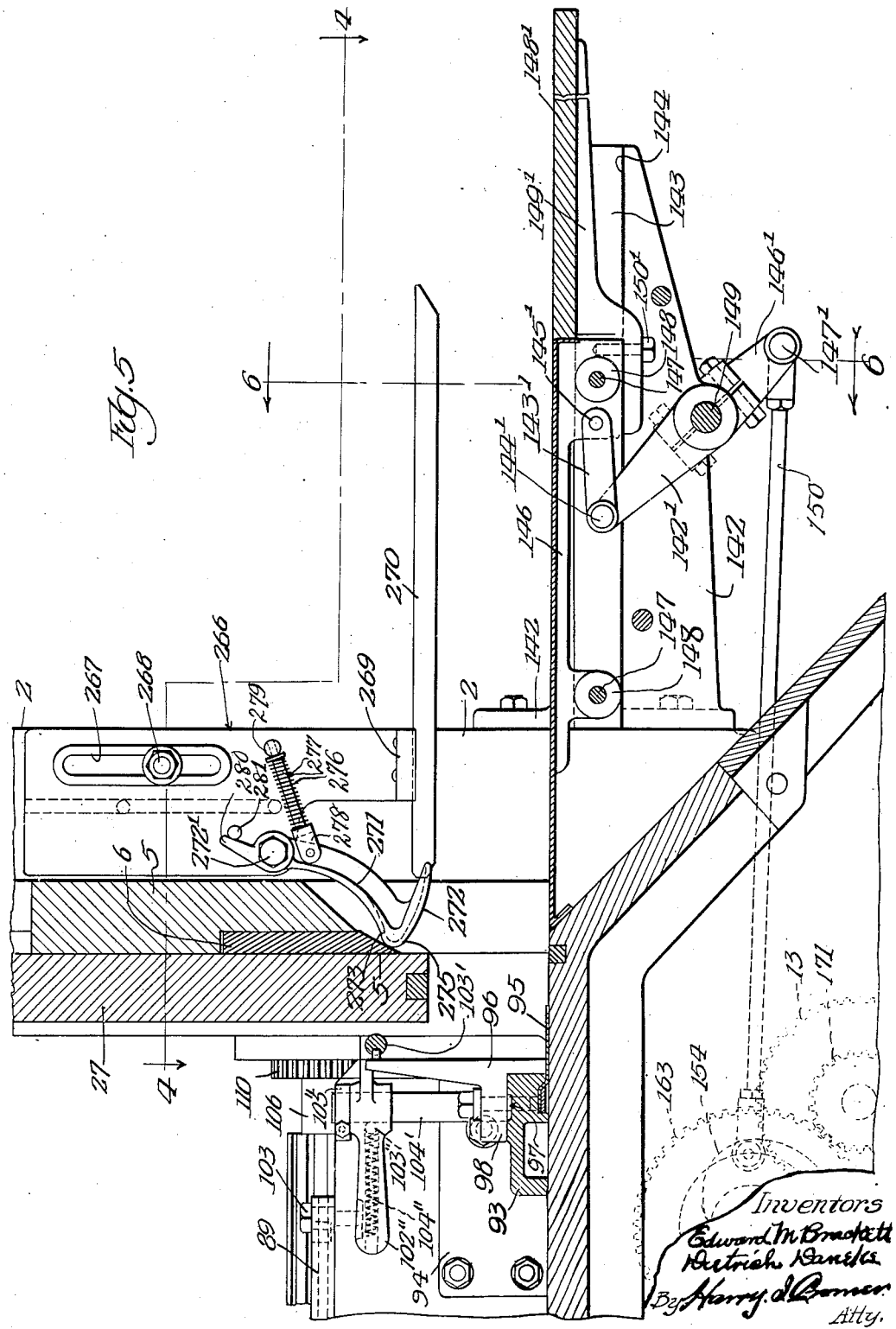

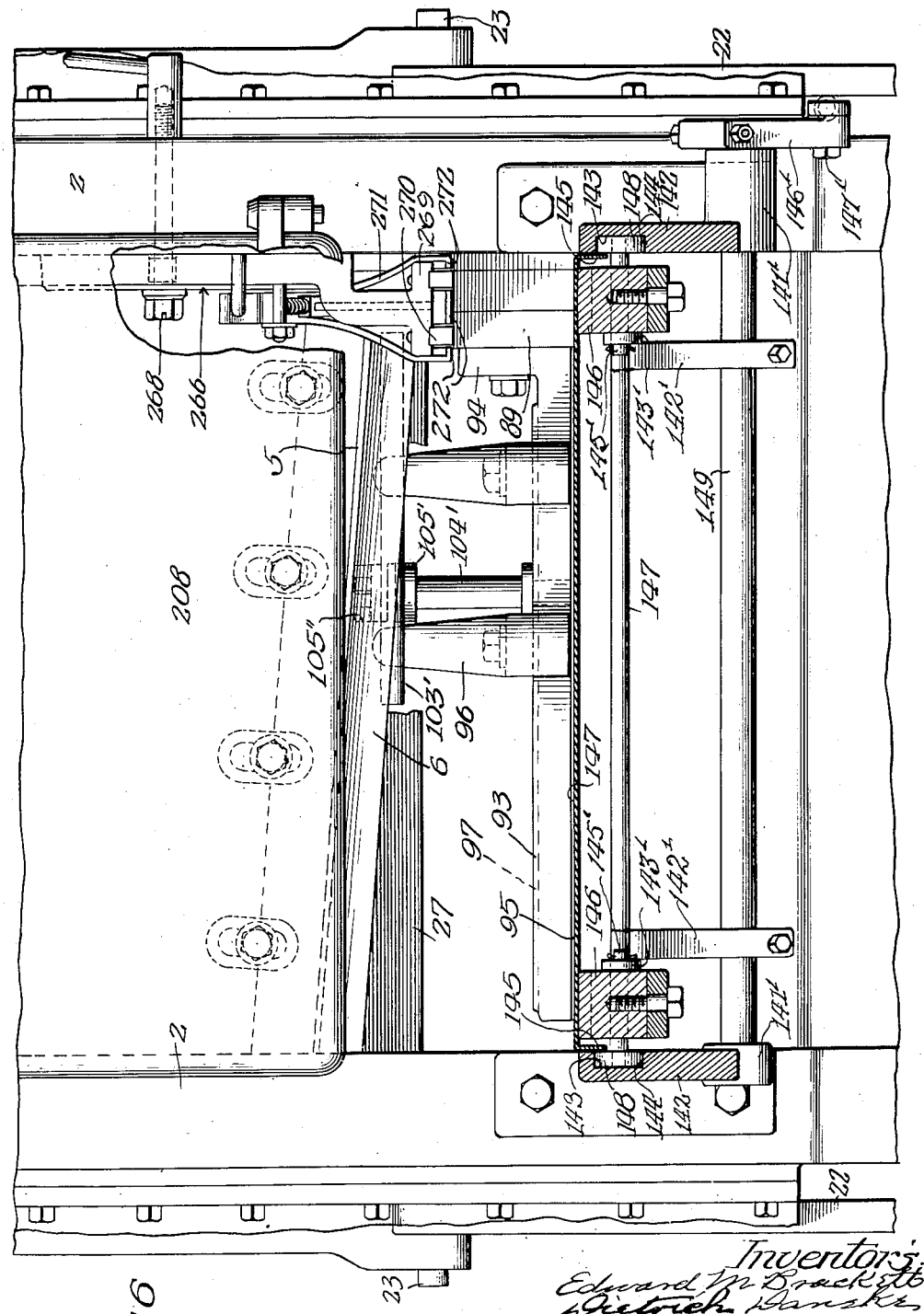

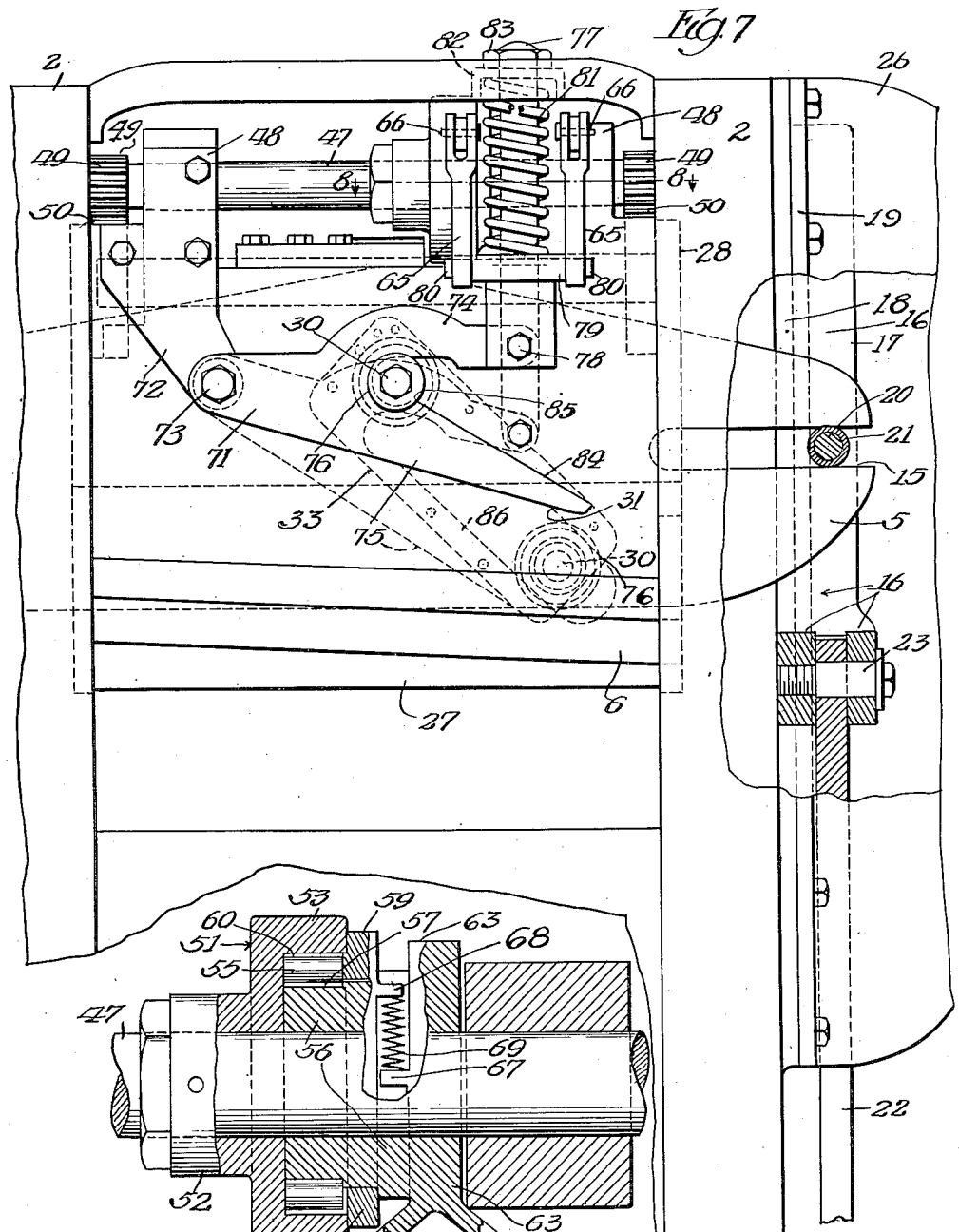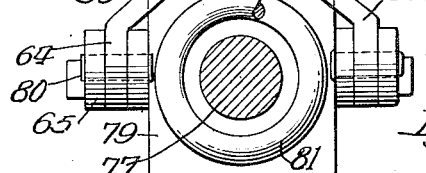

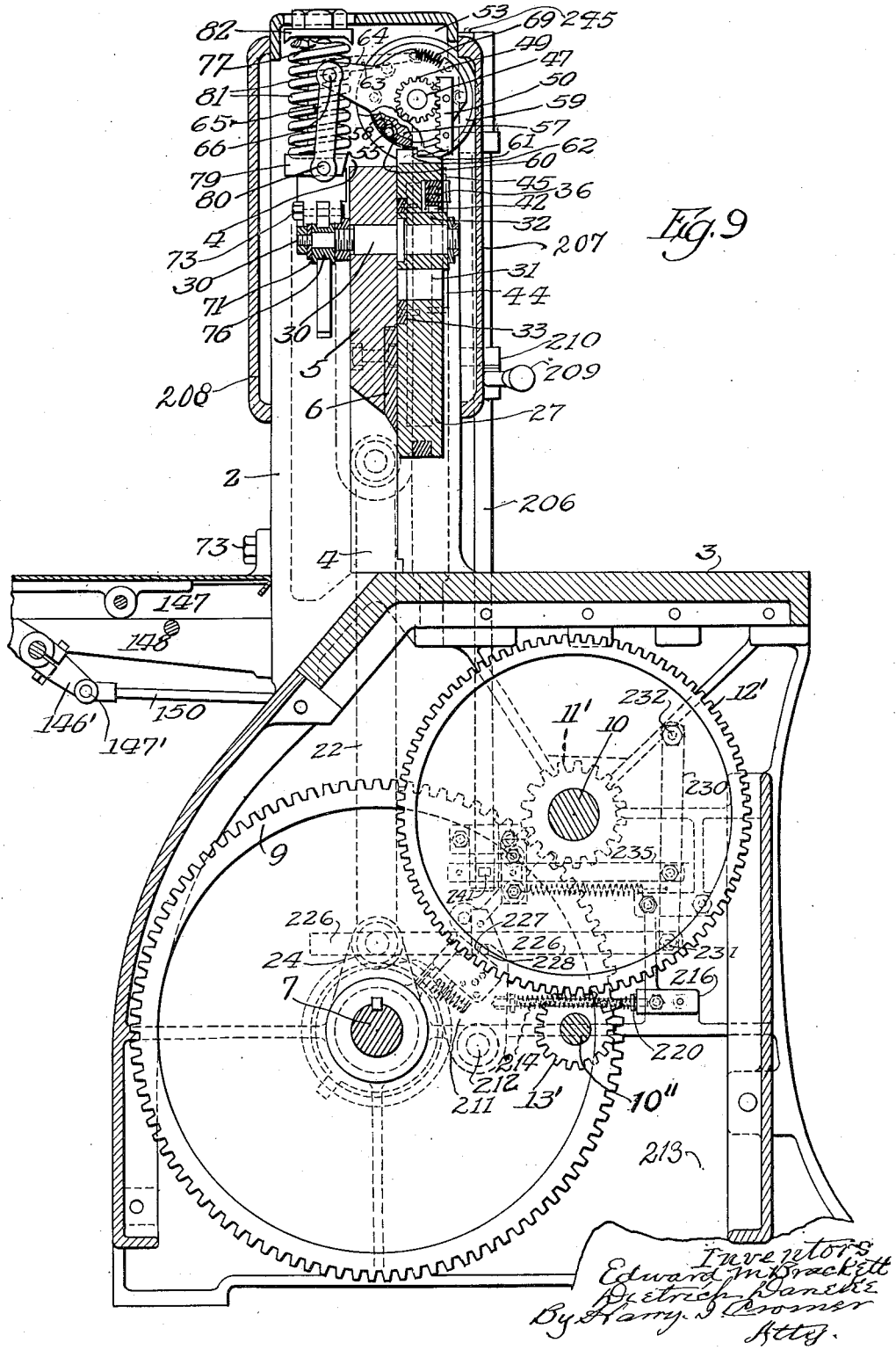

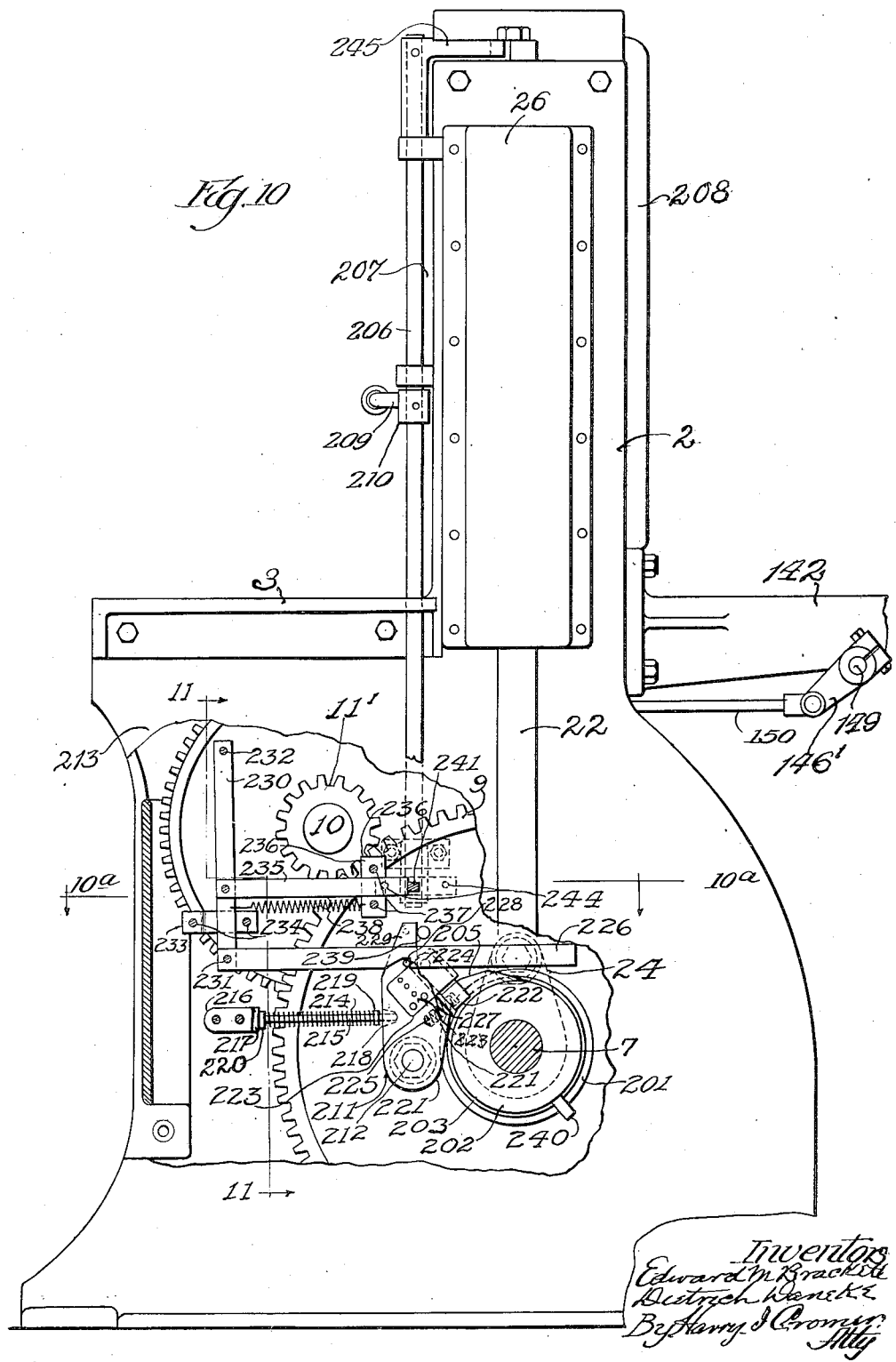

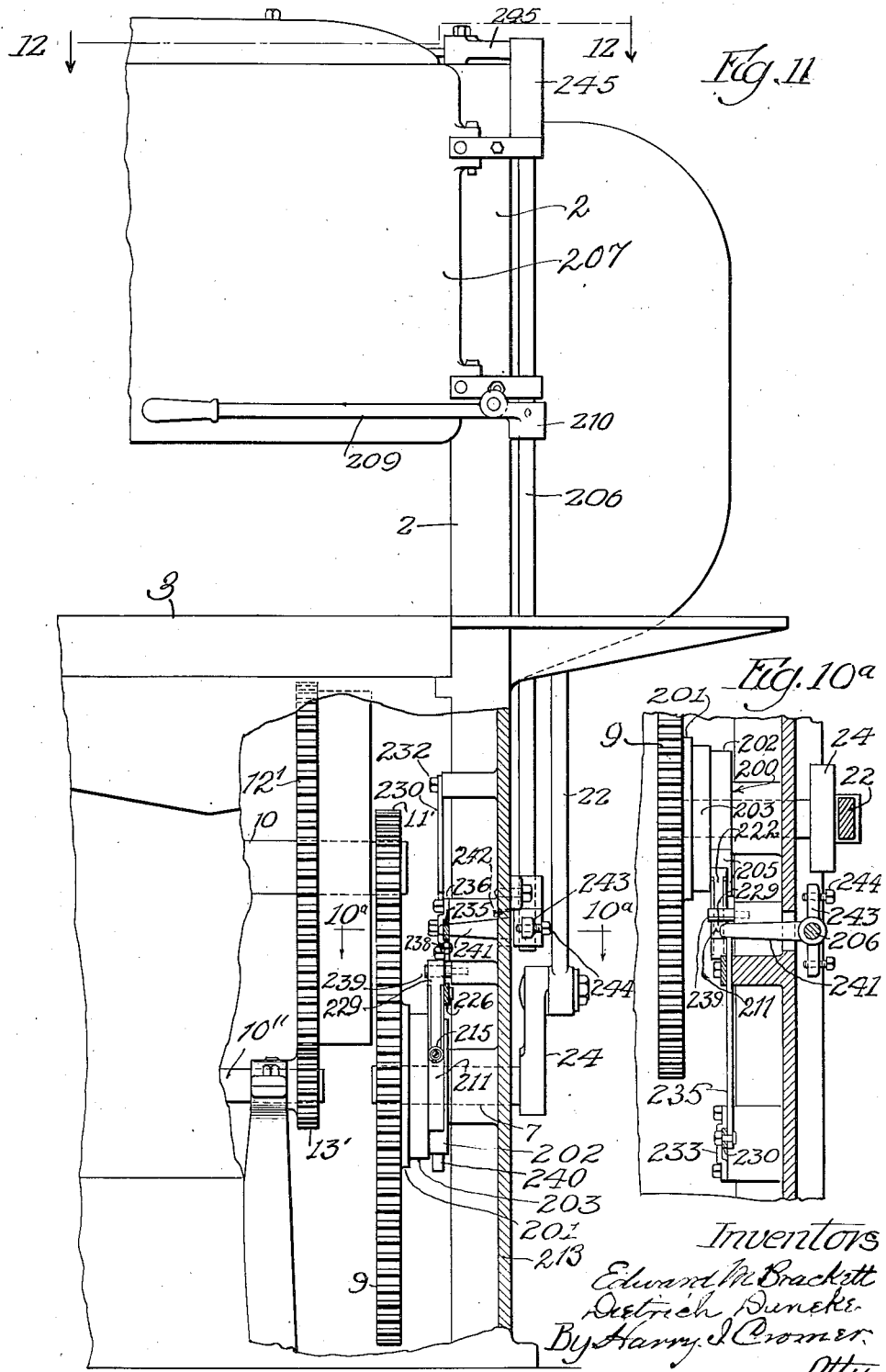

Patented May 12, 1931

1,805,128

UNITED STATES PATENT OFFICE

EDWARD M. BRACKETT AND DIETRICH DANEKE, OF TOPEKA, KANSAS, ASSIGNORS TO EDWARD M. BRACKETT AND FRED M. BRACKETT, COPARTNERS DOING BUSINESS UNDER THE FIRM NAME AND STYLE OF THE BRACKETT STRIPPING MACHINE COMPANY, OF TOPEKA, KANSAS

PAPER CUTTING AND TRIMMING MACHINE AND GAUGE AND GAUGE-STOP, CARRIER, HOLD-DOWN, AND SAFETY MECHANISM THEREFOR

Application filed April 30, 1928. Serial No. 273,967.

This invention relates to paper cutting or trimming machines and gauge and gauge-stop, carrier, hold-down and safety mechanism therefor, of the type having a knife, knife-operating means and a feed table, and having a movable paper positioning gauge, and movable gauge-stop mechanism adapted to be automatically moved into and out of position to operatively engage and release the movable gauge, to stop and permit the movement of the same, for positioning the paper, and having a carrier table located back of the knife, and carrier table operating means operatively connected with the knife or knife-operating means, or with both the gauge-stop mechanism and knife or knife-operating means, or to machines provided with one or more of said elements as set forth in the respective claims. Subject matter of invention described and shown but not claimed in this application, will be found described and claimed in two divisional applications both filed by the above-named applicants, Edward M. Brackett and Dietrich Daneke, jointly, April 8, 1931, Serial No. 528,590 for improvements in paper cutting and trimming machines and safety mechanism therefor; and Serial No. 528,591 for improvements in paper cutting and trimming machines and clamping and shock-absorbing mechanism therefor.

The principal object of the invention is to provide a simple, economical and efficient paper cutting or trimming machine.

A further object of the invention is to provide an improved paper cutting or trimming machine having a knife or knife-operating means and a feed table, with improved paper-positioning gauge and gauge-stop mechanism comprising a series of adjustable gauge-stops having actuating means adapted to be connected with a source of power, such as a motor driven shaft, or with the knife or knife-operating mechanism and adapted to enable the gauge-stop mechanism to be operated concurrently with or synchronized with respect to the operations of the knife.

A further object of the invention is to provide an improved paper-cutting or trimming machine having paper carrier or delivery mechanism operatively connected with the gauge or gauge-stop mechanism, or with the knife or knife-operating mechanism, for receiving and delivering or carrying away paper that has been operated upon by the knife.

A further object of the invention is to provide simple and efficient hold-down mechanism located back of the knife and adapted to engage and hold down or in place the stacks of cut paper or material operated upon by the knife, and more particularly to provide suitable hold-down mechanism operatively connected with and adapted to be automatically operated by or concurrently with the operations of the knife or knife-bar, or knife operating mechanism.

A further object of the invention is to provide an improved paper cutting or trimming machine with suitable hold-down or clamping mechanism including a main paper engaging clamp operatively connected with and adapted to operate concurrently with the knife, and by preference located in front of the knife, and hold-down mechanism located rearward of the knife, for holding down or in place cut paper or material that has been cut or trimmed, and improved means for operating said clamping and hold-down mechanism.

Other and further objects of the invention will appear from the following description and claims and from an inspection of the accompanying drawings, which are made a part hereof.

The invention consists in the features, combinations, details of construction, and arrangement of parts herein described and claimed.

In the accompanying drawings:—

Fig. 2 is a view in transverse vertical section taken on line 2—2 of Fig. 1 looking in the direction indicated by the arrows;

Fig. 3 is a detail plan view, partly in section, showing the front feed table and gauge and gauge-stop mechanism, and the rear carrier table, and part of the carrier table actuating mechanism, with the knife-bar and main paper engaging clamp shown in horizontal section, with parts broken away;

Figure 1:
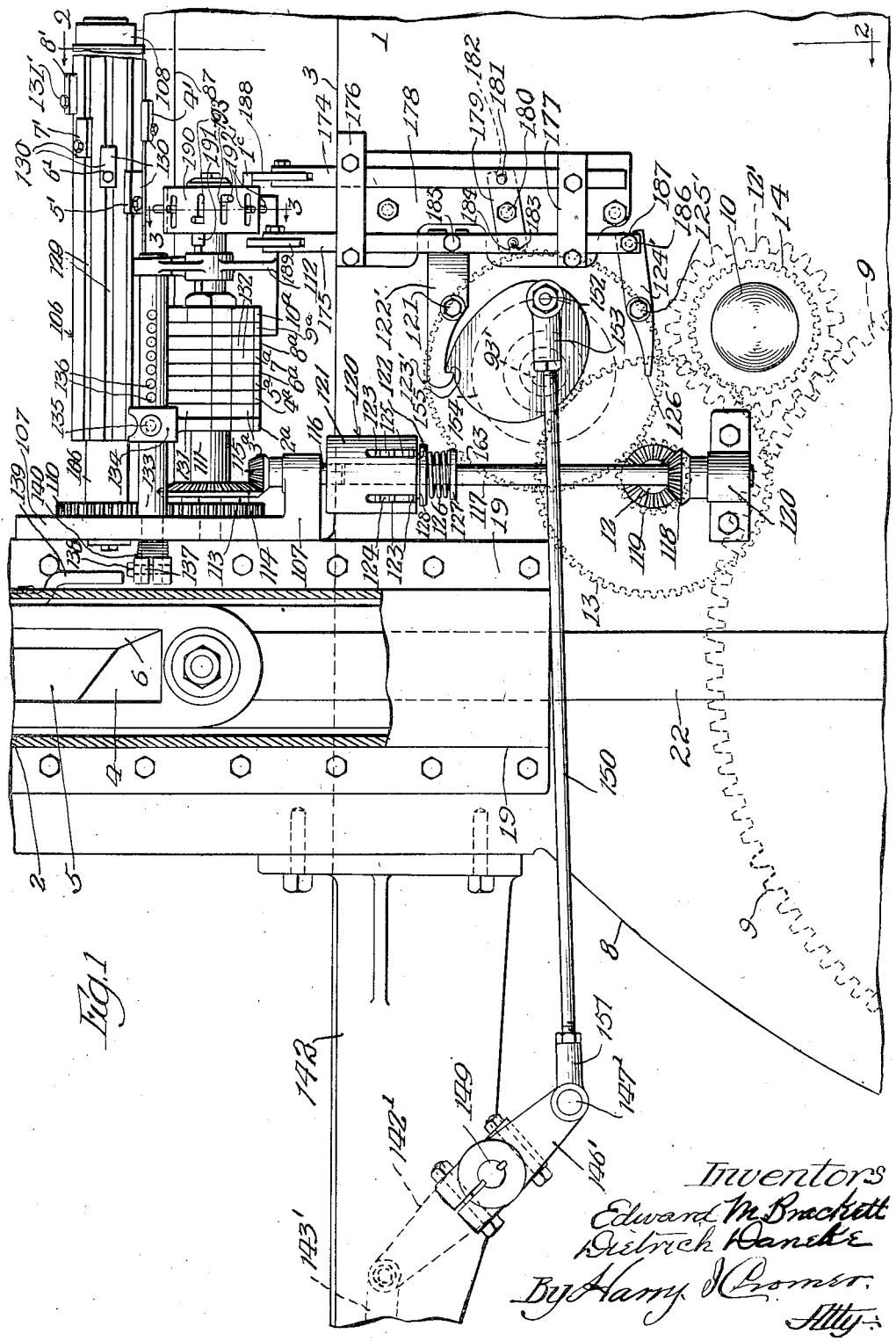
Figure 1 is a view in side elevation of an improved paper cutting or trimming machine constructed in accordance with our invention showing the gauge-stop mechanism and rear carrier table and carrier table operating mechanism operatively connected with each other and with the knife or knife-operating mechanism, with parts broken away, and other parts omitted.

Fig. 3ª is an enlarged detail view in transverse section taken on line 3—3 of Fig. 1 looking in the direction indicated by the arrows;

Fig. 3ᵇ is a detail view in vertical section taken through the vertical center of Fig. 3ª;

Fig. 4 is a plan view, partly in section, showing the rear carrier or delivery table, and the hold-down mechanism located back of and adapted to be operatively engaged by the knife or knife-bar, and showing the knife-bar and main paper engaging clamp in horizontal section;

Fig. 5 is an enlarged detail view in vertical section taken on line 5—5 of Fig. 4 looking in the direction indicated by the arrows, and showing the rear hold-down mechanism in side elevation, and showing the rear carrier table in longitudinal vertical section;

Fig. 6 is a view in transverse section taken on line 6—6 of Fig. 5, looking in the direction indicated by the arrows, and showing the rear hold-down mechanism and front paper positioning gauge in rear elevation, and the rear carrier table in transverse vertical section, with the rear door of the top housing closed, and parts broken away;

Fig. 7 is a view in rear elevation of the upper portion of the machine shown in Fig. 1, with parts broken away or omitted;

Fig. 8 is an enlarged detail view taken on line 8—8 of Fig. 7, looking downward as indicated by the arrows, and showing the clutch mechanism in horizontal section;

Fig. 9 is a view in vertical section, showing the upper part of the machine and the side frame and safety tripping mechanism, as the same would appear taken on line 9—9 of Fig. 2, looking in the direction indicated by the arrows, with parts omitted;

Fig. 10 is a view in side elevation of the machine shown in Figs. 1, 2, 3 and 4 and 9, with part of the rear carrier table broken away, and with part of the side frame broken away and showing the safety tripping mechanism, which is illustrated in Fig. 9;

Fig. 10ª is a detail view taken on line 10—10 of Fig. 10 looking downward, and showing the main clutch and safety tripping mechanism;

Fig. 11 is a detail view in elevation showing the safety tripping mechanism shown in Fig. 10;

Figures 12, 13:
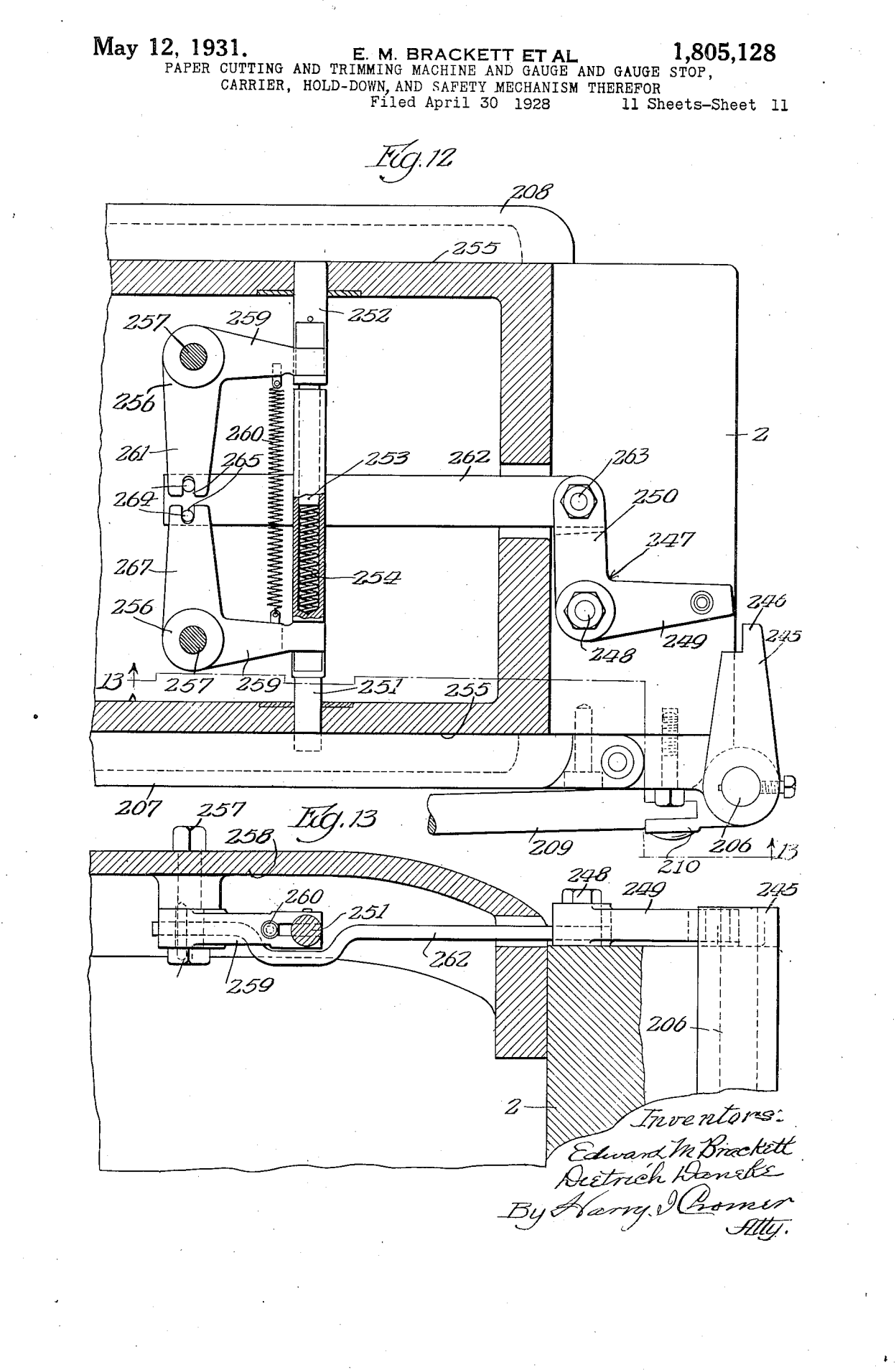

Fig. 12 is an enlarged detail view partly in horizontal section taken on line 12—12 of Fig. 11 looking downward, and showing a top plan view of the safety tripping mechanism shown in Fig. 10 and Fig. 11; and Fig. 13 is a view partly in vertical section taken on line 13—13 of Fig. 12, and showing the safety tripping mechanism shown in Fig. 12, in front elevation.

In constructing an improved paper cutting and trimming machine provided with paper-positioning gauge mechanism and gauge-stop positioning and operating mechanism constructed and adapted to operate in accordance with this invention, a main frame 1 is provided having a pair of upright knife-supporting and clamp-supporting side frame members 2, 2 which project upward on opposite sides of a feed table or bed 3, which is upon and forms a part of the main frame. Each upright side frame member 2 is provided with a vertical guiding slot 4, which is adapted to admit and slidably support, and to permit the upward and downward movement of a horizontal knife-supporting bar 5 and knife 6 fixed to said knife-supporting bar, within said upright slots, and between and in sliding engagement with the opposed parallel upright side margins of said slots or ways.

The knife bar is operatively connected with suitable knife-operating mechanism, which may be of any desired ordinary and well-known or suitable form, and which, in the form of the device shown in the accompanying drawings, comprises a knife-operating crank shaft 7, which is rotatively mounted in suitable lower side frame portions 8 of the machine frame. The crank shaft 7 is operatively connected with a suitable source of power, such, for example, as an electric motor, by suitable shaft and gear mechanism which, by preference, includes a spur gear wheel 9 fixed to the crank shaft 7 and operatively connected with a motor-driven shaft 10 by means of a toothed gear wheel 11' on and rotative with the shaft 10 and in toothed engagement with said wheel 9. The shaft 10 is connected with the motor or source of power—10'—by suitable gears including a gear wheel 12' on the shaft 10 and suitable gear and clutch mechanism which may be of any ordinary and well-known or suitable form adapted to enable the shaft 10 or 7 to be connected with and disconnected from the motor or source of power, such as gear 13' on motor shaft 10'' (Fig. 2).

The knife bar 5 is provided at each end with a horizontal slot 15. And at each end of the knife bar and in position to straddle and move upward and downward therewith, is a movable knife-supporting and operating frame or sliding shoe 16 having upright side flanges 17 which form the side walls of a vertical slot through which the slotted knife-bar extends, and having upright guiding side flanges 18 which project at an angle to the upright flanges 17 and are slidably supported and held in vertical guiding grooves or ways in the corresponding side frame members 2 by means of upright guiding strips 19 each of which is fixed to a corresponding upright side frame member 2 in position to slidably engage and hold a corresponding upright flange 18 of a knife-supporting shoe 16 in its proper groove. The knife is thus raised and lowered by the upwardly and downwardly movable shoes 16 which are connected with the knife bar and with the crank shaft 7 by means of horizontal pins and rollers 20 and 21 mounted in the shoes 16, and upright connecting rods or pitmen 22 located at opposite ends of the knife bar and connected with the shoes 16 and crank arms 24 at the opposite ends of the crank shaft 7, as hereinafter more particularly described. (See Figs. 1, 3, 4, 6, 7, 9, 10.)

Each of the slidable knife-supporting frames or shoes 16 is connected with the adjacent horizontally slotted end portion of the knife bar 5 by means of a horizontal transverse pin 20 which extends through the corresponding end slot 15 in the knife bar and has its opposite ends anchored in the upright webs 17 of the adjacent sliding frame or shoe 16. And each pin 20 has an antifriction roller 21 thereon which engages the inner margins of the slot 15 through which the pin extends.

Each upwardly and downwardly movable knife-supporting frame or shoe 16 is operatively connected with the crank shaft 7 by means of an upright connecting rod or pitman 22, the upper end of which is pivotally connected with the lower extremity of the corresponding shoe 16 by means of a pin 23, and the lower end of which connecting rod is operatively connected with the crank shaft 7 by means of a crank 24 fixed to said shaft, and the crank pin or wrist pin 25 on said crank and extending through a suitable opening in the lower end of said connecting rod.

Side shields 26 are fixed to the upright frame members 2 for protecting the shoes 16 and other moving parts, and said shields are partly broken away for purposes of illustration.

A paper-engaging clamping member or plate 27 is mounted in front of and in parallel relation to the knife-supporting bar and knife, and is provided with marginal portions or upright guiding flanges 28 on its opposite vertical side margins, which are slidably mounted in suitable upright guiding grooves or ways 29 in the inner faces of the adjacent stationary upright side frame members 2. (See Figs. 2, 3, 4, 6, 7 and 9.)

This paper-engaging clamping member 27 is operatively connected with the knife bar 5 by suitable connecting means which, in the form shown in the drawings, comprises a horizontal stub-shaft 30 which is anchored in and in fixed relation to the knife bar and projects forward and rearward beyond the knife bar. The forward end of the stub-shaft 30 extends through an inclined slot 31 in the upwardly and downwardly movable paper-engaging clamp or clamping member 27, and an anti-friction roller 32 is mounted on said forward end of the stub-shaft 30 with its periphery between and in engagement with the parallel inclined walls of the inclined slot 31. The upper extremity of the inclined slot 31 is, by preference, curved upward relatively to the parallel inclined walls of said slot. And it will be readily understood by those skilled in the art that the upward movement of the knife bar will carry upward with it the clamping member 27 when the roller 32 on the stud or stub-shaft 30 is in engagement with the upper end of the inclined slot 31 in said clamping member, and that said connection between the knife bar and said clamping member thus furnished by the stub-shaft and inclined slot will permit the clamping member 27 to move downward with the knife bar and knife until said clamping member engages the top of the paper to be operated upon and clamped or held in place beneath the knife. But, as soon as the downward movement of the clamping member 27 is stopped by the paper thus held in position by the clamp, the further downward movement of the knife bar and knife with the stud-shaft 30 movable in the inclined slots, will cause the knife to move endwise and downward at an incline corresponding to the inclination of the slot, so as to give the knife the shearing movement while in cutting engagement with the paper or material clamped or held in place by the clamping member 27.

Suitable shock-absorbing mechanism is provided for minimizing the shocks which would otherwise occur when the stub-shaft 30 reaches the limit of its upward movement in the inclined slot. For this purpose a tripping and shock-absorbing lever 36 is pivotally mounted on the paper-engaging clamp member 27 by means of a pivot pin 37, and is provided with a lever arm 38 having an anti-friction roller 39 thereon adapted to normally engage the roller 32 on the stub-shaft 30, in the inclined slot 31. The lever member 36 has an upper lever arm 40 which is provided with an anti-friction roller 41 normally located above or beyond the upper extremity of the path of movement of the stub-shaft 30 and roller 32, and adapted to engage a rocking arm or cushioning member 42, which is pivotally supported upon a pivot 43, and held in place by a spring-pressed cover plate 44. The cover plate 44 has a projecting radial arm 45 which extends into a recess 46 in the clamping member 27, for preventing the rotation of the cover plate and holding it in proper operative position.

An upwardly and downwardly movable rotative clamp-supporting shaft 47 extends through suitable openings or bearings in upright bearing brackets or arms 48 which are fixed to and project upward from the upper edge of the clamp 27, and is provided at its opposite ends with pinions 49 which are in toothed engagement with adjacent stationary upright toothed racks 50 fixed to the inner margins of the corresponding stationary upright frame members 2 already described. The rotative shaft is thus adapted to support and to move upwardly and downwardly with the clamp 27. The rack and pinion mechanism is thus adapted to cause the shaft to rotate in one direction during the downward movement of the shaft and the clamping mechanism supported thereby, and to rotate in an opposite direction during the upward movement of the same. It will thus be readily understood that by locking the shaft against rotation when the shaft and clamp have reached the limit of their downward movement, with the clamp in clamping engagement with the paper, the clamp may be releasably secured or locked in such lowered paper-engaging clamping position, and that, by releasing and permitting the rotation of the shaft in the direction in which it would rotate in its upward movement, the clamp may be released.

Suitable means is provided for thus automatically locking and releasing the clamp-supporting upwardly and downwardly movable shaft 47, and thereby automatically locking and releasing the clamp. And means is also provided for operatively connecting the clamp and clamp-operating and locking and releasing means with the knife bar or knife and knife-operating mechanism, all of which will be found fully illustrated and described in a co-pending application filed by the applicants herein September 16, 1927, Serial Number 219,998, for improvements in paper-cutting and trimming machines, and clamping mechanism therefor.

Briefly described, the locking and releasing mechanism for automatically locking and releasing the clamp-supporting shaft 47 and clamp 27, and the means for operatively connecting the clamp and clamp-operating and releasing means with the knife bar or knife and knife-operating mechanism, is constructed as follows:

A fixed clutch member or ratchet member 51 is mounted upon and in fixed relation to the upwardly and downwardly movable clamp-supporting shaft 47. This outer clutch member or ratchet member 51 is, by preference, annular and has a hub 52 which is fixed to the shaft 47, and an annular peripheral flange or rim 53 the inner wall of which forms a circular track or race for a series of rollers 55, which are mounted in and adapted to travel circumferentially of and within the annular flanged portion or race thus formed.

An inner movable rocking clutch member or cam 56 is loosely mounted on the shaft, and its annular main body portion extends within the annular space inside of the annular flange 53 of the outer or fixed clutch member 51, and between the rollers 55 and the shaft, so that the peripheral cam faces on the annular inner cam member 56 are adapted to engage and release the rollers 55. An intermediate annular cage member 59 loosely encircles the inner cam or clutch member 56 and has integral segmental sections (not shown) which extend between the rollers 55 for holding them in properly spaced apart rotative relation to each other and to the inner and outer clutch members 56 and 51. The said intermediate annular roller-cage member 59 has a projecting peripheral shoulder or stop 61 which is adapted to engage a projecting stop 62 on the upper margin of the paper-engaging clamp member 27, for limiting the rotation of said cage member in one direction.

A ratchet lever or clutch-operating and releasing lever 63 is loosely mounted on the shaft 47 adjacent to and in position to be rigidly secured to the end surface of the inner cam member 56, and the projecting arm portion of said lever 63 is forked so as to form a pair of integral forked lever arms 64 the outer ends of which are connected with the upper ends of depending links 65 by means of pins 66, said links being operatively connected with the stub-shaft 30 on the knife bar by suitable connecting means which will be hereinafter briefly described, and said operating lever being operatively connected with the intermediate roller-cage member 59 by suitable resilient connecting means (not shown).

A clutch-operating or ratchet-operating and releasing lever 71 is pivotally supported upon or connected with the paper-engaging clamp 27 and is movable upward and downward with said clamp, but on the opposite or rear side of the knife bar and knife.

For this purpose, a rear depending bracket arm 72 is fixed to one of the upper bracket arms 48 on the upper edge and at or near one end of the clamp 27. The bracket thus formed by the bracket members 72 and 48 extends over the top of or straddles the knife bar 5, so as to support the clutch operating lever 71 back of the knife bar, and upon and in pivotal relation to the lower extremity of said bracket member 72 to which the lever 71, for operating and releasing the clutch or ratchet mechanism on the shaft 47, is pivotally attached by means of a pivot pin 73. (See Figs. 7 and 9.)

The pivoted clutch-operating or ratchet-operating and releasing lever 71 is in the form of a forked lever having an upper forked arm 74 and a lower forked arm 75, which are spaced apart and adapted to admit therebetween and to operatively engage an anti-friction roller 76 on the rear extremity of the stub-shaft 30 already described, said stub-shaft being anchored in the knife bar. The upper forked arm 74 of the forked lever 71 is connected with the forked lever arms 64 of the clutch or ratchet operating and releasing lever 63 by means of an upright connecting rod 77 which is pivotally connected at its lower extremity with the outer swinging end of said upper lever arm 74 by a pivot pin 78. And a cross-head 79, pivotally connected with the lower ends of and supported by the depending links 65, already described, by projecting end bosses 80 on said head and which extend into suitable openings in the lower extremities of said links 65, supports a heavy compression spring 81 which encircles the upright rod 77 and is interposed between the upper face of said cross-head 79 and a washer 82 on the upper extremity of the connecting rod. The washer is held in position on the upright rod by means of one or more nuts 83. And the rod extends through an opening in the cross-head 79.

A yielding connection is thus formed between the upper forked arm 74 of forked lever 71, and the forked arms 64 of the clutch-operating or ratchet-operating and releasing lever 63 on the rotative shaft 47 already described.

The lower forked arm 75 of the clutch or ratchet-operating or releasing member 71, located back of the knife, has an upper roller-engaging surface or margin 84 which is straight and extends from a roller-engaging shoulder 85 to the lower outer end of said lever arm. (See Fig. 7.) The downward movement of the knife-bar 5 and stub-shaft 30 with the anti-friction roller 76 from the position in which said parts are shown in Fig. 7, or raised position, to lowered position, will thus cause the roller 76 to engage the shoulder 85 on the lower forked arm 75 of the forked lever 71 and move said arm 75 downward about its axis, formed by the pivot pin 73, into a lowered locking position in which the upper margin 84 of the forked arm 75 will be flush with the inclined inner bottom margin 86, or in the same inclined plane with said margin 86 of the inclined slot 31 in the paper-engaging clamp 27 on the front side of the knife bar. From the foregoing, it will be readily understood by those skilled in the art that the shaft 47 is always free to rotate in one direction during the downward movement of said shaft and the paper-engaging clamping member 27, and is releasably held or locked against rotation in an opposite direction during such downward movement and at the termination of said movement.

An improved gauge mechanism or paper-positioning mechanism—which includes, by preference, a movable gauge and a series of adjustable gauge-stops, and means for positioning and operating the gauge-stops for controlling the position of the paper-positioning gauge, and means for operatively connecting the gauge-stop positioning and operating mechanism with the knife-bar and knife or knife-operating mechanism—is provided and constructed in accordance with our invention, as follows:

A stationary upright gauge and gauge-guide 87 is mounted upon or adjacent to one side of the feed table 3 and in position to extend at right angles to the knife 6, the upright side face of the said guide, which faces toward the feed table, being perpendicular to the horizontal flat top face of the feed table and at right angles to the knife. A movable or adjustable transverse paper-positioning gauge 88 is mounted in slidable engagement with and adapted to be guided by said stationary upright gauge and gauge-guide 87 and in position to extend at right angles to the latter and transversely over or part way across the top of the feed table and in parallel relation to the knife. The movable or adjustable gauge 88 is constructed, by preference, as follows:

A guiding head 89, which forms part of said movable gauge 88, is mounted in sliding engagement with the upright straight side face of the stationary gauge-guide 87, and has a transversely extending top flange 90 which projects over the top of the stationary guide 87 and to the under side of which is secured a bottom flange 91 which projects beneath the transverse longitudinal flange or shoulder 92 on the outside of the upper margin of the stationary gauge-guide 87, as shown in Figs. 2, 3, 4 and 5.

A transverse horizontal gauge arm or base 93 is rigidly secured at one end to the slidable guiding head 89 by means of an upright end flange 94 on said base, and suitable securing bolts which extend through openings in said flange and are anchored in the guiding head.

A thin flat bottom plate 95 is secured to the bottom of the base 93 and projects beyond the bottom margin of the base toward the knife and in sliding engagement with the top of the feed table in position to extend under and support the adjacent or front marginal portion of the stack of paper or material to be operated upon. And any desired number of upright paper-engaging guide posts 96 are adjustably mounted upon and rigidly secured in upright paper-engaging position on the gauge arm or base 93 which is, by preference, provided with a top longitudinal guiding slot 97 in the top face of said base. Each of the upright guide posts 96 has a horizontal base flange or shoulder 98 which is provided with a slot or opening 99 through which extends a threaded bolt 100 mounted in a threaded opening in the base, for holding the guide post in place upon the base.

The upright guide posts are, of course in alignment with each other and suitably spaced apart longitudinally of the base, and, by preference extend downward to the bottom plate 95 or to the feed table or bed. The guide posts are also in alignment with the paper-engaging upright flat face 101' of the guiding head 89, which is at right angles to the paper-engaging upright face of the stationary gauge guide and paper guide 87 already described.

A tripping latch or stop arm 101 is pivotally supported upon and adapted to be adjusted horizontally by means of an adjustable block 102 which is pivotally connected with the guiding head 89 by means of an upright bolt or pivot 103 which is anchored in the guiding head and forms an axis upon which said block and latch are adapted to be moved or adjusted.

A headed adjusting screw 104 is rotatively mounted in an upwardly projecting slotted supporting member 105 on the guiding head 89, and in screw-threaded engagement with an upright swivel pin $102^1$ rotatively mounted in an opening in the adjustable block 102 and having a horizontal threaded opening into which said adjusting screw extends.

A horizontal hold-down bar or rod 103' is detachably supported upon the base 93 of the gauge 88 by means of an upright post 104', the bottom of which is secured in screw-threaded engagement with a threaded opening in said base. Said hold-down rod or bar is supported upon and in vertically adjustable relation to said post 104' by means of a head 105' fixed to said rod and having a vertical opening through which the upright post extends. A handle 102" fixed to said head, is provided with a spring-pressed friction member 103" mounted in an opening in said handle and held in frictional engagement with the upright post by a spring 104". The collar 105" fixed to the upper end of said post, serves to limit the upward movement of the head and hold-down bar which is adjustable upward and downward on the supporting post to any desired position according to the height of the stack of paper to be engaged and held down by said bar 103' and between said bar and the bottom plate 95 already described. The latch 101 is considered as a part of the movable gauge 88 on which it is mounted, to form a stop for engaging the movable gauge stops.

A horizontal rotative gauge-stop supporting and positioning cylinder or shaft 106 is rotatively mounted adjacent to and in position to extend in parallel relation to the path of movement of the gauge 88 and outer end 104 of the tripping finger or arm 101 on the gauge head 89. This cylinder or shaft 106 is supported at one end upon a frame arm or bracket 107 which is attached to the adjacent upright frame member 2, and at the opposite end by a suitable bracket 108.

Means is provided for rotating or operating the gauge-supporting cylinder or shaft 106 and for operatively connecting the same with the knife and knife-operating mechanism, and with suitable stopping and releasing ratchet mechanism, for positioning or controlling the stopping and releasing of the gauge-stop supporting cylinder or shaft 106, with the adjustable gauge-stops 109 thereon.

For this purpose a spur gear wheel 110 is fixed to and rotative with the rear end of said shaft or cylinder 106. A ratchet-supporting shaft 111 is rotatively mounted in parallel relation to the gauge-stop supporting shaft 106 and has its rear end journaled in the bracket arm 107 already described, and its forward end journaled in the outer extremity of a supporting bracket 112 which is secured to the machine frame in position to support the forward end of said ratchet-supporting shaft 111 as shown in Figs. 1, 2, 3 and 4. (See also Figs. 6 to 11.) A spur gear wheel 113 is fixed to the ratchet-wheel supporting shaft 111, and is in toothed engagement with the mating wheel 110 on the gauge-stop supporting shaft 106, so that said shafts 106 and 111 will rotate synchronously. A bevel gear wheel 114 is fixed to the ratchet-wheel supporting shaft 111, and a beveled pinion 115 is fixed to the upper section 116 of an upright driving shaft which is journaled in the bracket 107, the lower section 117 of said upright driving shaft being operatively connected with the driven shaft 12, herein described, by means of a beveled gear wheel 118 fixed to said lower shaft section 117, and in toothed engagement with a beveled gear wheel 119, on said shaft 12. The lower end of the sectional shaft 117 is journaled in a suitable bearing 120 which is attached to the machine frame. (See Fig. 1.)

The upper section 116 and lower section 117 of the upright driving shaft comprising said sections, are operatively connected, by preference, in such a way that the lower section 117 is permitted to rotate constantly and without interruption while the machine is in operation, and the upper section 116 is permitted to be stopped and released, so as to rotate intermittently as desired.

In order to connect said shaft sections in a simple and efficient manner a friction clutch 120 is provided, which may be of any ordinary and well-known or suitable form adapted to automatically connect and release said shaft sections as required. The clutch shown in the accompanying drawings comprises an outer upper clutch member 121 which is fixed to the upper shaft section 116, a lower inner clutch member 122 fixed to the lower shaft section 117 and rotative therewith, friction plates 123 having peripheral projections or bosses slidably mounted in longitudinal peripheral slots or grooves 124 in the outer upper clutch member 121, so as to rotate with said outer clutch member, and intermediate friction plates 125 attached to and adapted to rotate with, and to be moved longitudinally of the lower shaft section 117, so as to provide a variable frictional engagement between the friction plates thus connected with and adapted to rotate with the outer clutch member 121, and the friction plates which are connected and adapted to rotate with the lower inner clutch member 122 and lower shaft section 117. A helical compression spring 126 encircles the lower shaft section 117 and is interposed between a head 127 fixed to said lower shaft section and a bottom inner clutch member 128 which encircles said lower shaft section and engages and is adapted to move upward and downward longitudinally of said lower shaft section with the lowermost friction plate of the series of friction plates above described which form the frictional connection between the outer clutch member 121 and inner lower clutch member 122.

The rotative cylindrical gauge-stop positioning and operating cylinder 106 is provided with a series of gauge-stop guides or longitudinal peripheral guiding grooves 129, and with a corresponding series of adjustable peripherally projecting gauge-stops 130 each slidably mounted in and in longitudinally adjustable relation to a corresponding longitudinal groove 129. The grooves are, by preference, dove-tailed, or narrower at the top than at the bottom, and have inclined side walls; and each of the gauge-stops 130, has a similarly tapered inner bottom tongue or base adapted to fit into and in slidable engagement with the inclined walls of the groove in which it is mounted, and each gauge-stop 130 is provided with a set screw 131′ thereon and in screw-threaded engagement therewith and adapted to be screwed into and out of engagement with the longitudinally grooved cylinder 106, for releasably holding the gauge-stop in any desired pre-determined adjusted position into which it may be moved, for positioning or stopping the paper-positioning gauge 88 whenever the tripper finger or stop 101 located on the gauge head 89 comes into contact with such adjustable gauge-stop 130 as the paper-positioning gauge 88, with the paper to be operated upon, is moved toward the knife by the operator. The projecting end 104 of the tripping finger or stop 101 is, of course, tapered in one direction, or triangular in cross-section, so as to present an upwardly inclined face toward the gauge-stops 130 and pass by any stop which may be in the path of movement of the projecting end 104 of said tripping finger 101 when the latter is moved with the gauge head 89 and gauge 88 away from the knife.

There may be any desired number of adjustable gauge-stops 130, each mounted in adjustable or longitudinally movable relation to the rotative gauge-stop supporting cylinder or shaft 106, and the gauge-stops may be adjusably secured to the rotative support by any well-known or suitable securing means. In the machine shown in the accompanying drawings, ten adjustable gauge-stops 130 are shown which may be individually numbered 1′, 2′, 3′, 4′, 5′, 6′, 7′, 8′, 9′, and 10′, respectively, in the order in which they are arranged circumferentially of the rotative stop-supporting member or cylinder 106, and in which they pass into and out of the path of movement of or into and out of position to engage and stop the tripping finger or stop 101 on the gauge-head 89 of the paper-positioning gauge 88 already described.

Mounted on and in fixed relation to the rotative ratchet-wheel supporting shaft 111, already described, which shaft is directly connected and adapted to rotate synchronously with the rotative gauge-stop supporting and positioning member or cylinder 106, is a gauge-stop controlling and releasing toothed ratchet wheel 131, which is formed, by preference, in sections each having a different number of teeth, each tooth corresponding with an individual gauge-stop 130, and with a corresponding cut or operation of the knife in making a predetermined cut when the paper to be operated upon is in a position which is determined or controlled by the position of such gauge-stop. The sections of the toothed ratchet wheel 131 may be distinguished and individually numbered successively in their order, according to the number of ratchet teeth 132 thereon, 2a, 3a, 4a, 5a, 6a, 7a, 8a, 9a, and 10a, respectively. (See Figs. 1 and 3.) The ratchet-wheel section 2a has two ratchet teeth. The ratchet-wheel section 3a has three ratchet teeth. Wheel section 4a has four teeth; section 5a, five teeth, wheel section 6a, six teeth; section 7a, seven teeth; section 8a, eight teeth; section 9a, nine teeth; and the last ratchet-wheel section 10a has ten teeth. (See Figs. 1 and 3.)

A pawl-supporting and operating ratchet releasing shaft 133 is rockingly mounted in suitable bearings in the brackets 107 and 112 in parallel relation to the rotative ratchet-wheel supporting shaft 111 already described. And slidably mounted upon and in longitudinally adjustable relation to said rocking shaft 133 is a stopping and releasing pawl or finger 134, which is adapted to engage and stop or release the ratchet teeth of any desired or pre-determined ratchet-wheel section of ratchet-wheel 131, already described. The pawl 134 has, by preference, an annular body portion which encircles the rock shaft 133, and is provided with a set-screw or bolt 135, which may be in screw-threaded engagement with and is supported by the pawl 134, and is adapted to be inserted in any desired peripheral opening or recess 136 in said rock shaft 133, there being an opening or recess 136 for each section of said toothed ratchet member or sectional ratchet wheel 131, already described.

The rock shaft 133 has a tripping lever arm 137 fixed to one end thereof by means of a bolt 138, or other suitable securing means; and a tripping arm or finger 139 is fixed to an adjacent upwardly and downwardly movable knife-supporting and operating side frame 16, already described. A helical coil spring 140 encircles the rock shaft 133 and is operatively connected therewith, and with the tripping arm 137, in such a manner as to yieldingly and releasably hold the projecting end of the pawl 134 in engagement with the sectional toothed ratchet wheel 131, already described.

From the foregoing description it will be readily understood by those skilled in the art that the lower section 117 of the upright driven shaft comprising upper and lower sections 116 and 117 releasably connected by a friction clutch 121, will be in constant rotation when the machine is in operation, and that whenever the pawl 134 on rock shaft 133 engages a tooth on the sectional ratchet wheel 131, the upper section 116 of said upright shaft will be stopped while the lower section 117 will continue to rotate. When the pawl 134 is raised or operated so as to release the sectional ratchet wheel 131—for example, when the tripping finger 139 on the upwardly and downwardly movable knife-operating frame or shoe 16 moves downward with the knife and engages and trips the tripping arm 137 on the pawl-supporting rock shaft 133—the ratchet wheel 131 thus released, will be rotated, or partially rotated; and its rotative movement will continue until stopped by the pawl 134 coming in contact with a tooth of said sectional ratchet wheel. It will also be readily seen that the rotation of the sectional ratchet wheel 131 will be stopped whenever the pawl 134 engages a tooth of said ratchet wheel, and in a position corresponding with the position of such tooth. It will also be obvious, in view of the foregoing, that the sectional ratchet wheel 131 will thus be intermittently operated and stopped as many times as there are ratchet teeth on the section of said ratchet wheel which is being operatively engaged, or stopped and released by the automatically operated pawl 134.

The rotative gauge-stop supporting and operating cylinder 106 with its stops 130 thereon, and the sectional ratchet wheel 131 are thus adapted to rotate intermittently in synchronous relation to each other and to the knife.

The gauge-stop positioning and operating mechanism herein described is intended and adapted to enable the operator to set the gauge mechanism by simply setting or adjusting the pawl 134 in position to operatively engage a pre-determined section of the sectional ratchet wheel 131, and by setting one or more of the adjustable gauge-stops 130 in the proper position or positions longitudinally of the gauge-stop supporting cylinder 106, so that the required stop or stops 130 will be automatically presented in the required pre-determined order in the path of movement of the pivoted stop 101 on the gauge head 89, for stopping the gauge 88 and the paper to be positioned thereby, in position to enable as many cuts to be made consecutively and in the required order, as may be desired, and repeated in cycles each consisting of a pre-determined number of individual cuts corresponding with the individual adjustable gauge-stops 130 employed.

For example, by setting the pawl 134 in position to engage section 2a of the sectional ratchet wheel, having two teeth and setting adjustable gauge stops 1' and 2' in position to control the position of the paper for two cuts to be embraced within a cycle, said adjustable stops will be presented in pre-determined order and repeatedly in the same order for as many desired cycles as may be required.

By setting the pawl 134 in position to operatively engage section 3a, having three ratchet teeth and setting the corresponding three adjustable gauge-stops 1', 2' and 3' in the proper position longitudinally of the gauge-stop supporting cylinder 106, for controlling the position of the paper with respect to the knife for three cuts to be embraced within a single cycle, which is to be repeated as many times as may be desired, the three adjustable stops thus set will be presented successively in pre-determined order and synchronously with respect to corresponding pre-determined strokes of the knife, so that the required three cuts corresponding with the three gauge-stops employed, may be made repeatedly and in the same order for as many cycles as may be desired.

It follows, as a matter of course, that by setting the pawl 134 in position to operatively engage section 4a, having four ratchet teeth, and setting the corresponding gauge-stops in their proper relatively adjusted position on the rotative gauge-stop supporting cylinder 106, cycles consisting of four cuts each may be repeated as many times as desired, and so on throughout the entire set of ratchet wheel sections from 2a to 10a inclusive, and throughout the entire set of adjustable gauge-stops from 1' to 10' inclusive.

In the machine shown in the drawings a reciprocatory carrier or delivery table 141 is mounted back of and adapted to receive and carry stacked sheets of cut paper from the knife; and delivery table operating means is operatively connected with said table and with the knife-operating means or knife and adjustable gauge and gauge-stop mechanism, whereby the movements of the carrier or delivery table are effected and coordinated and synchronized with respect to the operations of the knife and of the gauge-stop mechanism, so that the cut paper may be received upon the carrier table and carried from the knife concurrently with or immediately following the completion of any desired predetermined stroke or strokes of the knife, or cuts corresponding with such strokes, and automatically.

The carrier or delivery table 141 is mounted back of the knife upon and in position to reciprocate or move backward and forward toward and from the knife and toward and from the rear delivery margin of the feed table 3 upon and between horizontal supporting bracket arms or side frame members 142 which are located on opposite sides of the machine frame and of said carrier table and bolted or otherwise rigidly secured to corresponding upright side frame members 2, or other suitable stationary supports. Each carrier-table supporting bracket or frame member 142 is, by preference, hollowed out on its inner side to form an inner horizontal groove 143, the bottom margin of which forms an inner horizontal track 144 on which the carrier table 141 is slidably or reciprocatingly supported. The flat top of the carrier table is, by preference, formed of heavy sheet metal the opposite side margins of which are bent down to form depending side flanges 145 and rigidly secured to horizontal side bars or table-frame members 146 which extend longitudinally of and beneath the opposite side margins of the flat sheet metal top of the carrier table and are covered by the same. The flat top of the carrier table is substantially level with the top of the front feed table 3.

The horizontal side bars 146 on which the table top is secured may be formed of cast metal and provided with re-enforcing side ribs for affording rigidity and strength. And transverse horizontal rods 147, 147 extend transversely across and beneath the flat top of the carrier table and are mounted in suitable openings in the horizontal side bars or table frame members 146 through which the opposite ends of said rods project into the horizontal grooves 143 and over the tracks 144 formed by the bracket arms 142. The rods 147 thus form axles on which are rotatively mounted anti-friction rollers 148 which are located within the grooves 143 and supported and adapted to travel backward and forward on the tracks 144 along with the carrier table 141 which they support.

The carrier table actuating means, by which said carrier or delivery table is automatically operated intermittently and operatively connected with and synchronized with respect to the knife and knife operating mechanism, gauge and gauge-stop mechanism, and paper-clamping and releasing mechanism, is constructed and adapted to operate as follows:

A transverse crank shaft 149 is rockingly mounted in suitable bearings 141' in the bracket arms or side frame members 142, and extends beneath and transversely beyond the opposite side margins of the carrier table. Fixed to said rocking crank-shaft is a pair of inner crank arms 142', the upper ends of which are operatively connected with the reciprocatory carrier or delivery table 141 by means of connecting links 143'. One end of each of said links is pivotally connected with the corresponding crank arm 142' by means of a connecting pivot pin 144'; and the other end of each of said links is pivotally connected with the carrier table 141 by means of a connecting pivot pin 145' one end of which is fixed to the carrier table side frame member or side bar 143 and the other end of which extends through a suitable opening in the end of said crank arm.

A third crank arm 146' is fixed to the outer projecting end of said rocking crank shaft 149 and provided with a crank pin 147'; and an intermittently oscillating or reciprocatory connecting rod 150 is operatively connected with said crank and crank pin by suitable connecting means which may consist of an ordinary pitman-head 151 screwed onto the end of the connecting rod or pitman 150 and having a transverse opening therein through which the crank or wrist-pin extends. The opposite end of the connecting rod 150 is operatively connected with the rotative shaft 93' by means of a crank plate 154 fixed to said shaft and provided with a wrist or crank pin 152 fixed to said crank plate or escapement plate 154 and extending through a suitable opening in a pitman head or connecting member 153 on the end of said connecting rod or pitman.

The carrier table 141 shown in the accompanying drawings is provided with a rear extension 148' which is detachably mounted on and adapted to extend rearward from the rear margin of the main carrier table. Said extension is secured to the main carrier table by means of side bars 149', the forward ends of which are secured in overlapping engagement with the rear end of the side bars 146 by means of securing screws 150', or other suitable securing means.

Since the delivery table is to be operated intermittently and its movements are to be automatically controlled and synchronized with respect to any desired predetermined operations of the knife, and with respect to corresponding or correlated operations of the gauge-stops and the mechanism for positioning or operating the gauge-stops, it is desirable that means be provided whereby the shaft 93' for intermittently operating the delivery table, may be rotated intermittently, and the shaft 12 may be permitted to rotate constantly and to be constantly connected with the source of power when the machine is in operation.

For example, the intermittently rotative shaft 93' is, by preference, provided with a spur gear wheel 163 loosely mounted thereon. A collar 164 is fixed to said shaft. A leather washer 165 is interposed between said collar and wheel; and a similar leather washer or friction disk 166 is interposed between said gear wheel 163 and a loose collar 167 which is loosely mounted on the end of the shaft 93'. And a compression spring 168, which is interposed between the collar 167 and an outer collar 169 held in place on the end of the shaft by a headed bolt 170, serves to hold the collars 164 and 167 and the gear wheel 163 and said washers in frictional engagement with each other. The gear 163 is thus releasably connected with the intermittently rotative shaft 93'. And the tension of the spring 169, which can be adjusted as desired, serves to maintain the required frictional connection between the said gear and shaft to insure the desired intermittent rotation of the shaft when it is automatically released by the escapement mechanism and driven by said gear wheel 163, and to permit the automatic stopping of the shaft by the escapement mechanism, while the gear wheel 163 continues to rotate without interruption.

The shaft 12 is operatively connected with the motor or source of power by means of a spur gear 13 fixed to the shaft 12, and a spur gear 14 keyed to and rotative with the shaft 10 and in toothed engagement with the gear 13, the shaft 10 being connected with the motor—10'—as already described. And the gear wheel 163 on shaft 93' is releasably connected with the constantly rotative shaft 12 by means of an adjustable spur gear wheel 171 which is keyed to and rotative with, but movable longitudinally of said shaft 12 into and out of toothed engagement with the said gear wheel 163. A shifting yoke 172 having forked yoke arms in engagement with an annular peripheral groove 173 in the hub of the gear wheel 171, is mounted upon a suitable support which may be either a shifting rod or a pivoted lever. (See Fig. 2.) The shifting mechanism or yoke 72 is thus adapted to serve as a simple and convenient means for operatively connecting the gear wheel 163 with the gear wheel 171 on the shaft 12, and for disconnecting said gear and thereby connecting and disconnecting the shafts 93' and 12.

The carrier table 141 and its actuating and controlling mechanism, including the intermittently rotative carrier-table actuating shaft 93' and the escapement plate 154 fixed to said shaft, are operatively connected with the gauge-stop positioning and controlling mechanism, including the pawl and ratchet and tripping mechanism, and with the knife and knife-operating mechanism, by preference, as follows:

Pivotally mounted on a supporting pivot pin 121' adjacent to the cam plate 154 is an upper escapement pawl or releasing and stopping lever 122' having at one end thereof a hooked end portion 123' which is adapted to be moved into and out of the path of movement of the peripheral shoulder or stop 155 on the rotative escapement plate 154, for automatically releasing and stopping the rotation of said escapement plate, and the shaft 93' on which the escapement plate is mounted. A similar lower escapement pawl or releasing and stopping lever 124' is pivotally mounted on a supporting pivot pin 125' adjacent to the bottom peripheral margin of the escapement plate 154, and has a plate-engaging releasing and stopping end portion 126' which is movable into and out of the path of movement of said peripheral stop 155 on said escapement plate, for releasing and stopping the rotation of said escapement plate and said shaft 93' at pre-determined intervals alternately with respect to the releasing and stopping of the escapement plate and said shaft by the said upper pawl 122'.

Connected with the pawls 122' and 124' is a pair of upwardly and downwardly movable pawl-operating reciprocating plungers 174, 175, which are mounted in upright position parallel to each other in longitudinally slidable engagement with upper and lower plunger-supporting and guiding bearings 176 and 177.

The bearing members 176 and 177 are, by preference, mounted on a supporting plate 178 which is rigidly secured to the main frame of the machine. The plungers are thus slidably supported in parallel upright spaced-apart relation to each other. And a rocking lever 179 is pivotally mounted upon a horizontal supporting pivot pin or bolt 180 located midway between the upright plungers, one end of said pivoted lever being connected with the plunger 174 by means of a pin 181 in said lever, and the opposite end of said lever being connected in a similar manner to the other plunger 175 by means of a pin 183 which is supported on said plunger and extends through an end notch or opening 184 in said lever. The plunger 175 nearest to the escapement plate, is directly connected with the upper pawl 122' by means of a pin 185 mounted on the plunger and extending through an elongated end opening or notch in said pawl. And said plunger 175 is connected in like manner with the lower pawl 124' by means of a headed pin or bolt 186 mounted in the lower end of said plunger and adapted to extend through an opening or notch 187 in the adjacent end of said pawl.

It will be readily understood from the foregoing that the downward movement of either plunger will cause the other to move upward, and vice versa. It will also be readily seen that the downward movement of the plunger 174 to the position in which it is shown in Fig. 1 will raise the plunger 175 to the position shown in said Fig. 1, and will move the lower pawl 124' to releasing position out of engagement with the escapement plate 154, and simultaneously move the upper pawl 122' into position to engage and stop the rotation of the released escapement plate 154 by engaging the shoulder 155 on said plate.

With the plungers and escapement mechanism in the positions shown in said Fig. 1 the carrier table 141 will be in its outer retracted position as shown in full lines in Fig. 3.

It follows, of course, that the next operation of the plungers will cause the plunger 175 to be lowered and the other one, 174 to be raised, thus causing the pawl 122' to be released from engagement with the shoulder 155 on the escapement plate 154, and simultaneously causing the plate-engaging end of the lower pawl 124' to be raised into the path of movement of the shoulder 155, so as to stop the rotation of the escapement plate and the shaft 93' when the carrier table 141 swings inward to receiving position near the knife, as shown in full lines in Figs. 4 and 5. Each downward movement of the plunger 174 will thus cause the carrier table to be released and permitted to swing backward to delivery position as shown in full lines in Fig. 3. And each downward movement of the plunger 175 will cause the carrier table and its actuating mechanism to be again released and the table to be moved forward to receiving position.

Plunger-operating means connected with the gauge-stop positioning mechanism is provided which is adapted to cause the plungers and carrier table to be operated automatically and in synchronous relation to pre-determined operations of the knife and of the gauge-stop positioning mechanism, as follows:

The plunger 174 is provided with an anti-friction roller 188 rotatively mounted on a transverse horizontal axle between forked arms on and integral with the upper end of said plunger; and the plunger 175 is provided with a similar anti-friction roller 189 rotatively supported between upper forked arms on the upper end of said plunger, upon a horizontal axis. The horizontal axes of the rollers 188 and 189 are in the same vertical plane.

The upper ends of the plungers and the anti-friction rollers thereon are spaced apart and in the same vertical plane with and below the level of the axis of the ratchet-supporting shaft 111 already described. And a plunger-operating wheel or head 190 is fixed to and adapted to be intermittently rotated with and by means of said shaft 111 and provided with a plurality of plunger-engaging and operating members consisting of or comprising, by preference, ten longitudinally adjustable bosses or bolts $1c$, $2c$, $3c$, $4c$, $5c$, $6c$, $7c$, $8c$, $9c$, and $10c$, one for each corresponding numbered adjustable gauge-stop 1' to 10' inclusive. It will also be noted that there is one of said bosses or plunger-operating bolts for each ratchet tooth on the ten-toothed section $10a$ of the sectional ratchet 131, and that said ratchet-teeth and said plunger-operating bosses or bolts are arranged in the same consecutive order, so that when any ratchet tooth 1'' is engaged by the pawl 134, a corresponding plunger-operating bolt $1c$ will be in position to either engage or pass without engaging the roller on the upper end of the raised or highest one of the pair of plungers 174, 175. Whether the plunger-operating bolt will engage the plunger roller or not will, of course, depend upon whether the bolt is in its retracted or neutral position, or in plunger-engaging extended position. And when the plunger-operating bolts or any one or more of them are adjusted to extended plunger-engaging position on one side of the head or wheel 190 they will engage and operate the adjacent plunger provided it is in raised position in the path of movement of such bolt or bolts, but will pass the other plunger. When the plunger-engaging or operating bolts are in their central or neutral retracted position they will pass both plungers.

For convenience, the entire series of plunger-operating bolts $1c$ to $10c$ inclusive will be designated by the reference numeral 191. Each of said plunger-operating bolts 191, is, by preference slidably mounted in a bore or socket in the head or wheel 190, the entire series of said bolts being arranged in a circle around the axis of the shaft 111 and wheel 190, and with their axes parallel to each other and in parallel relation to the axis of the said shaft and wheel. Each bolt 191 is, by preference, provided with a projecting pin or boss 192 which projects from the longitudinal center of the bolt outward radially through an elongated peripheral slot 193 in the wheel. These radially projecting bosses are adapted to serve as convenient handles for use in adjusting the bolts. Each bolt is, by preference, provided with three peripheral notches 194, 195 and 196, each adapted to be engaged by a spring-pressed detent or ball 197, which is mounted in a central opening or socket 198 which communicates with the opening in which the adjustable bolt is mounted. Each ball 197 is held yieldingly in engagement with the notched bolt 191 by a compression spring 199. (See Fig. 3$^b$.)

From the foregoing it will be readily understood that each of the plunger-operating bolts is adjustable to central or retracted position, as shown at the top of Fig. 3ᵇ, or to extended plunger-engaging position at one side of the wheel as shown at the bottom of said figure, for operating the plunger 174, or to the opposite side of the wheel, as shown in Fig. 1, for engaging and operating the plunger 175.

In constructing a safety tripping mechanism in accordance with this invention, and equipping a cutting or trimming machine therewith, a suitable clutch 200 is provided and operatively connected, by preference, with the crank shaft 7, for operating the knife, and with the gear mechanism by means of which the crank shaft is connected with the motor or source of power.

The clutch may be of any ordinary and well known or suitable form, but is, by preference of substantially the same form and construction as that shown in Figs. 7, 8 and 9, and comprises an outer clutch member 201, an inner clutch member 202, and an intermediate clutch member or roller cage 203 which is interposed between said inner and outer clutch members and serves to hold the usual series of rollers in spaced-apart relation in the annular race-way formed by the hollowed out annular outer clutch member, and in position to engage and cause the inner and outer clutch members to be held in fixed relation to each other when the clutch is engaged, and to release and permit the outer clutch member and the gear 9 to rotate freely while the crank shaft is held stationary, when the clutch is disengaged. The inner clutch member 202 and intermediate clutch member or roller-engaging and releasing cage 203 are yieldingly connected in the usual manner by means of the usual compression spring interposed between spring-pressed shoulders on said inner and intermediate clutch members respectively. As such clutches are well known and in common use it is believed to be unnecessary to describe or illustrate the same in detail herein.

The outer clutch member 201 is fixed to the gear wheel 9 which is free to rotate when the clutch is disengaged and the crank-shaft is stationary; and the inner clutch member 202 is fixed to the crank shaft and provided with an outwardly projecting tripping finger or detent 205, which is adapted to be engaged and stopped and released by the safety tripping mechanism constructed as follows. (See Figs. 9, 10, 10ᵃ and 11.)

An upright clutch-operating shaft or rod 206 is rockingly mounted in suitable bearings at one side of the main frame, in position to extend upward adjacent to the front side of one of the upright side frame members 2 already described, and outside of the adjacent side margin of the front door 207 which is hinged to one of the upright side frame members 2 and located in front of the knife and main paper-engaging clamp, for enclosing the same within the space between the upright side frames 2, 2 and the front door 207 and back door 208. (See Figs. 9 to 13.)

A clutch-operating hand lever or tripping lever 209 is attached to and adapted to swing in a horizontal plane upon the vertical axis formed by said upright clutch-operating shaft or rod. Said operating lever is located, by preference above the front feed table, and is adapted to normally extend horizontally in front of the knife and main paper-engaging clamp and in front of the closed door 207 which encloses said knife and clamp. The said lever is, by preference, hinged to the upright rod by means of a hinge member or head 210 fixed to said rod and having hinged engagement with the lever, whereby the lever is permitted to swing from its normal horizontal or lowered operative position in front of the knife and knife-enclosing door, to upright raised position adjacent to the upright rod 206 and at one side of the door, to permit the door to be opened. The upright clutch-operating rod 206 is operatively connected with the clutch mechanism on the crank shaft 7, by suitable means which may be constructed as follows:

A clutch-operating or tripping and releasing pawl 211 is pivotally mounted on a supporting stub shaft or pin 212 fixed to the side frame 213, or other suitable strong and rigid support, in position to engage and stop and release the tripping finger or detent 205 on the clutch 200 above described. The pawl is provided with means for yieldingly holding it in clutch-engaging position, said means consisting of a compression spring 214 mounted on a supporting rod 215, one end of which is supported by a bracket or supporting clip 216 attached to the side frame 213 or other suitable support and provided with an end flange 217 having an opening therein into which the end of the rod extends. The opposite end of the spring-supporting rod 212 extends loosely into a socket or recess 218 in the pawl and is provided with a loose collar 219 between the end of the spring and said pawl. A collar 220 is fixed to the end of the spring-supporting rod near the flange 217, for limiting or preventing the movement of the rod endwise.

The pawl 211 has a clutch-engaging and releasing shoulder 221 which is movable into and out of the path of movement of the clutch shoulder or detent 205; and a shock-absorbing device is interposed between said shoulder 221 and said clutch shoulder 205, and comprises a spring-pressed bolt or bar 222 mounted in a recess in the pawl 211 between flanges or side plates 223, and flexibly or pivotally supported upon said pawl and in position to extend between the shoulders on the clutch and pawl respectively, by means of a pivot pin 224 fixed to the pawl and extending through a suitable opening in the rod or bar 222, and a compression spring 225 seated in a recess in the pawl and in engagement with a recessed portion of said bolt or bar 222.

A pawl-actuating member consisting of a longitudinally movable bar 226 having a recessed portion forming a pawl-engaging hook or shoulder 227 adapted to releasably engage a pin 228 fixed to the lever arm 229 of the pawl 211, is pivotally connected at one end with a depending pawl-actuating lever 230 by means of a bolt 231, the upper end of said lever being pivotally connected with the side frame 213 or similar support, by a bolt 232. The lever 230 is thus adapted to swing upon the axis formed by said bolt 232. The oscillations or swinging movements of the lever are limited and the lever is guided and held in operative position by a guide 233 which is secured to the machine frame by bolts 234 located on opposite sides of said lever and extending through suitable openings in said guide. A longitudinally movable reciprocatory plunger 235 is slidably supported by a similar guide 236 secured to the machine frame by bolts 237 located respectively on opposite sides of or above and below said plunger; and said plunger is connected at one end with the depending lever 230. A tension spring 238 is connected at one end with the stationary guide or strap 236 and at its opposite end with said depending lever 230 and tends to yieldingly hold said depending lever and plunger and the pawl-engaging and actuating rod 226 in normal or initial position and to permit the pawl 211 to engage the tripping finger or clutch shoulder 205 of the clutch 200 in clutch disengaging or releasing position and hold the engaged clutch member and the crank shaft 7 against rotation until the pawl 211 is operated or withdrawn from engagement with the clutch to permit the operation of the crank shaft and knife.

A stop 239 engages and limits the movement of the pawl 211 toward the clutch; and a projecting peripheral tripping finger 240 on the clutch 200 serves to engage and raise the pawl-actuating bar 226 out of engagement with the pin 228 on the pawl 211 thus permitting the pawl to be returned by the spring 214 to clutch loosening or knife-stopping position.

The upright clutch-operating shaft or rod is operatively connected with the plunger 235 by means of a crank arm 241 fixed to the lower extremity of said upright rod and adapted to extend through an opening 242 in the machine frame and into engagement with the end of said plunger 235. Stop arms 243 which may be integral with the crank arm 241 and are located on the outside of the machine frame, are provided with set screws 244 in threaded engagement with said stop arms, and adapted to alternately engage the adjacent side frame 213, for limiting the turning movements of the upright clutch-operating shaft 206 and the operating lever 209 and preventing injury to the clutch-operating mechanism.

Safety mechanism is provided for locking the upright clutch-operating shaft 206 and operating lever 209 and the clutch-actuating mechanism connected therewith, in normal clutch releasing or loosening position, or in position to prevent the accidental or inadvertent operation of the knife or other parts of the machine, and especially when either of the doors 207 and 208 is open, or when the machine is not in all respects in condition for operation with safety to the machine and to the operator.

Said safety or locking mechanism comprises a locking lever or crank arm 245 fixed to the upper end of the upright clutch-operating shaft 206, and having a notched and shouldered end portion 246, a bell-crank 247 rockingly mounted upon a supporting pivot pin or bolt 248 anchored in the top of the machine frame and having a lever arm 249 adjacent to and adapted to be moved into and out of locking engagement with the notched and shouldered end of the locking crank arm or lever 245. The other arm 250 of said bell crank is operatively connected with a pair of telescoping spring-pressed bolts or plungers 251, 252, one of which is tubular or hollowed out and the other of which has a reduced stem portion 253 mounted within and in telescoping sliding engagement with the tubular member. A compression spring is seated in the tubular member and in engagement with the inner end of the inner telescoping member 252, and tends to press said telescoping members apart endwise. The outer ends of the telescoping spring-pressed plungers are thus pressed outward beyond the outer door-engaging faces of the upper frame portion 255 when the doors are open, and are in position to be pressed inward by the inner faces of the doors to retracted position when the doors are closed.

A pair of bell cranks 256 mounted upon and adapted to oscillate upon the vertical axes formed by upright supporting bolts or pivots 257 anchored in the top frame portion 258 of the machine, each have one lever arm 259 connected with and adapted to be operated by the adjacent one of said telescoping spring-pressed plungers, said arms 259 being connected by means of a tension spring 260 which tends to draw them together and also tends to draw the plungers 251 and 252 inward against the tension of the spring 254, but without overcoming the tension of the latter spring which is stronger than the spring 260. The other lever arms 261 of said bell cranks are each connected with the arm 250 of bell crank 247 by means of a connecting link or plunger 262, one end of which is connected with the bell crank 247, by a pivot pin or bolt 263, and the other end of which is connected with both of said arms 261 by pins 264 which are anchored in the link or plunger 262 and extend into end notches or recesses 265 in the lever arms 261 respectively.

Improved hold-down mechanism is provided including means for holding down and in proper order, stacked sheets of paper or material not only during the positioning of the material to be cut, but also during and immediately following the operations of cutting the same, and more particularly means, including paper-engaging clamping and hold down mechanism located in front of and back of the knife respectively, and adapted to simultaneously or concurrently engage and hold down and in place stacked material in front of and back of the knife both during and immediately following the strokes of the knife by which the material held in place back of the knife is severed from the material located and held down in front of the knife.

The hold-down mechanism located back of the knife is constructed, by preference, as follows:

A stationary hold-down bracket member 266 is provided having a flat-faced upright vertically slotted portion 267 which is adapted to be adjustably mounted and rigidly secured in engagement with the inner flat face of an upright frame member 2, or other suitable stationary support, by means of a headed securing bolt 268 which is adapted to extend through the vertically elongated slot in said upright slotted portion and through a suitable opening in the stationary frame member to which the bracket is to be attached.

The stationary hold-down bracket member 266 is provided at its lower extremity with a horizontally disposed head or flange 269 to which is admitted a pair or any desired number of parallel rearwardly extending guard arms or hold-down members 270, which are by preference in the form of smooth bars or rods the forward ends of which are fixed to the bottom head or flanged portion 269 of said bracket member 266, and suitably spaced apart, to enable said guard arms or bars to engage the top sheet or stack of sheets of material or extend over and closely adjacent to the top surface of the stack during and immediately following the operations of positioning and cutting the same, for holding the stacked sheets and more particularly the material located back of the knife and severed from the material held down in front of the knife, in place in even orderly stacks, and to enable the same to be fed or moved away from the knife without permitting the material to become disarranged.

A movable hold-down member 271 is mounted on or adjacent to the stationary bracket or hold-down member 266 with which it may be movably connected by means of a horizontal pivot pin or bolt 272 which extends through an opening in the member 271 and is fixed to the said supporting bracket member 266.

The movable hold-down member 271 is, by preference, formed of metal and movably mounted between the forward extremities of the horizontal stationary guard arms or bars 270 and their stationary support located back of said movable hold-down member, and the knife and knife-bar, which are located forward of and closely adjacent to said movable hold down member or shoe 271.

The hold-down member or shoe 271 is by preference, provided with one or more paper-engaging rearwardly extending guiding members 272 which are spaced apart and adapted to be moved forward and backward between the forward extremities of the stationary horizontal hold down members or bars 270 which, by preference, project forward of the stationary supporting member 269 and beneath the same in position to permit the stacks of sheet material to pass from the knife directly under the forward ends of said stationary members or hold-down bars as said sheet material is severed from the material located and held down between the main paper-engaging clamp and the front feed table, in front of the knife.

In the form shown in the accompanying drawings, the movable hold-down member or paper-engaging and guiding or feeding shoe 271 is of a hook-like shape, and comprises a depending forwardly and rearwardly movable or reciprocatory arm or body portion having a downwardly and forwardly inclined front face portion 273 which faces towards the knife and knife bar and the bottom of which terminates or merges into a rounded forwardly projecting nose or end portion 274 located, by preference in the path of movement of the rear inclined side face of the knife or knife bar, or of both the knife and knife bar and adapted to be slidably engaged by the same as the knife moves downward with each cutting stroke.

The rearwardly extending bottom shoe members or paper-engaging, feeding and guiding finger-like bottom soles 272 of the paper-feeding and guiding shoe 271 are joined at their front ends or bases with the front rounded nose or knife-engaging end portion of the shoe, and said rounded front end or nose 273 and said bottom rearwardly extending shoe portions may be formed in one integral piece. The nose or front end of the shoe is, by preference, curved downwardly and rearwardly from the extreme front end of the nose at the point indicated by the reference numeral 275, so that said curved bottom front portion of the shoe is adapted to present an inclined paper-engaging face or curved front bottom face in position to engage the top of the stacked sheets of paper or material as the material and said shoe are moved rearward with each stroke of the knife which cuts the material and engages and pushes both the feeding and guiding shoe and the severed material engaged by the shoe rearward away from the knife. The severed material while engaged by the feeding and guiding shoe is fed rearward under the stationary horizontal guard arms or hold-down bars, the bifurcated portions 272 of the shoe passing between and on opposite sides of the forward ends of the stationary hold-down bars 270, and the severed stacks of material engaged by the movable feeding and guiding shoe being fed back with the latter and under said bars, and between the latter and the rear carrier table or similar paper supporting means.

A tension spring 276 mounted on a swiveled rod 277 is connected at one end with the hold-down member 271 by a connecting head 278 on the latter. The opposite end of the rod is mounted slidably in a swivel pin 279 which is provided with an opening for receiving said rod which moves with the hold-down member as the spring is compressed and released. A stop finger 280 on the upper end of the hold down member 271 is adapted to engage a stationary stop 281 fixed to the upright frame or bracket member 266, and serves to limit the forward movement of the lower knife-engaging and paper-engaging part of the guiding and feeding shoe. (See Figs. 5 and 6, also Fig. 4.)

We claim:

1. In a cutting machine having a movable knife and knife-operating means, the combination of a feed table and a movable carrier table located on opposite sides of the knife, a supporting track upon which said carrier table is reciprocatingly mounted and movable toward and from the knife, and carrier-table operating means connected with the carrier table, including means for regulating and coordinating the operations of the carrier table relatively to the movements of the knife.

2. In a cutting machine having a movable knife and knife-operating means, the combination of a feed table extending forward of the knife, a movable carrier table located back of the knife, supporting tracks located back of the knife and in supporting engagement with the carrier table, and carrier-table actuating means operatively connected with the carrier table, for moving the same toward and from the knife, said actuating means including means operatively connected with the knife and with the carrier table and acting to control and synchronize the movements of the carrier table relatively to the movements of the knife.

3. In a cutting machine, the combination of a movable knife, a feed table extending forward of the knife and adapted to support material to be operated upon in position to be engaged by the knife, a movable carrier table located back of the knife, supporting tracks upon which said carrier table is reciprocatingly mounted, means for operating the knife, and carrier-table operating means connected with the knife-operating means, for moving the carrier table toward and from the knife, said carrier-table operating means comprising a rocking crank shaft, link mechanism connected with and forming a connection between the crank shaft and carrier table, and means for intermittently operating said crank shaft and carrier table in synchronized relation to the operations of the knife.

4. In a machine having a movable knife and knife-operating means, the combination of a movable carrier table, supporting tracks upon which said carrier table is mounted, a rocking crank shaft extending transversely with respect to the carrier table, a pair of crank arms fixed to said rock shaft, links connected with said crank arms respectively and operatively connected with the carrier table, and means for actuating the crank shaft, for moving said carrier table toward and from the knife to receive and carry material operated upon by the knife.

5. In a machine having a movable knife and knife-operating means, the combination of a movable carrier table, supporting tracks upon which said carrier table is mounted, a rocking crank shaft extending transversely with respect to the carrier table, a pair of crank arms fixed to said rock shaft, links connected with said crank arms respectively and operatively connected with the carrier table, and means for actuating the crank shaft, said actuating means comprising a constantly rotative driving shaft adapted to be connected with a source of power, and means operatively connected with said crank shaft and adapted to be operated by said constantly rotative driving shaft, for intermittently operating the carrier table.

6. In a machine having a movable knife and knife-operating means, the combination of a movable carrier table, a pair of carrier table supporting tracks located on opposite sides of said carrier table and disposed at right angles with respect to the knife, a rock shaft connected with the carrier table, and means for actuating the rock shaft, for moving said carrier table toward and from the knife at right angles with respect to the same, said actuating means comprising a constantly rotative driving shaft adapted to be connected with a source of power, and means operatively connected with the rocking crank shaft and adapted to be operated by said constantly rotative driving shaft, for intermittently operating the carrier table.

7. In a cutting machine having a movable knife and knife-operating means, the combination of supporting means adapted to support material in position to be engaged by the knife, a movable hold-down member mounted adjacent to the knife and adapted to engage the top of the material and move with the same at an angle relatively to the direction of movement of the knife, a stationary supporting member in engagement with said movable hold-down member, and guiding means associated with said stationary member and adapted to guide said material away from the knife.

8. In a cutting machine having a movable knife and knife-operating means, the combination of supporting means adapted to support material in position to be engaged by the knife, a reciprocatory hold-down member pivotally supported adjacent to and adapted to be slidably engaged and operated by the knife concurrently with the downward movements of the knife, and having a bottom paper-engaging shoe portion adapted to move with the engaged material away from the knife at an angle relatively to the direction of movement of the knife, and means for moving said pivoted hold-down member to initial position.

9. In a cuttitng machine having a movable knife and knife-operating means, the combination of a hold-down member mounted adjacent to the delivery side of the knife, and having stationary guiding arms extending away from the knife at an angle relatively to the direction of movement of the knife, a reciprocatory hold-down member pivotally supported adjacent to and adapted to be slidably engaged and operated in one direction by the knife, and having a bottom shoe adapted to engage and move with the engaged material away from the knife and toward the adjacent ends of said guiding arms, and means connected with the movable hold-down member, for moving the same to initial position.

10. In a cutting machine having a movable knife and knife-operating means, the combination of supporting means adapted to support material in position to be engaged by the knife, a movable clamping member located forward of the knife, means for moving said movable clamping member into and out of clamping engagement with the material to be operated upon, stationary guiding means mounted adjacent to the delivery side of the knife, and a movable hold-down member mounted adjacent to and adapted to be engaged and operated in one direction by the knife, said movable hold-down member having a bottom shoe portion adapted to engage and move with the engaged material away from the knife and toward said stationary guiding means, and means associated with the movable hold-down member, for moving the same to initial position.

In witness whereof we have hereto attached our signatures this 26 day of April, 1928.

EDWARD M. BRACKETT.
DIETRICH DANEKE.